United States Patent
Yamasaki et al.

(10) Patent No.: US 8,064,296 B2
(45) Date of Patent: Nov. 22, 2011

(54) OPTICAL HEAD, OPTICAL DISC DEVICE AND INFORMATION RECORDING AND/OR REPRODUCING DEVICE

(75) Inventors: Fumitomo Yamasaki, Nara (JP); Yoshiaki Komma, Osaka (JP); Toshiyasu Tanaka, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 204 days.

(21) Appl. No.: 12/415,033

(22) Filed: Mar. 31, 2009

(65) Prior Publication Data
US 2009/0262629 A1 Oct. 22, 2009

(30) Foreign Application Priority Data
Apr. 1, 2008 (JP) ................................. 2008-094694

(51) Int. Cl.
*G11B 11/00* (2006.01)
(52) U.S. Cl. .................................................. 369/13.28
(58) Field of Classification Search .......................... None
See application file for complete search history.

(56) References Cited

U.S. PATENT DOCUMENTS

| | | | | |
|---|---|---|---|---|
| 5,835,472 A | * | 11/1998 | Horie et al. | 369/110.02 |
| 6,049,519 A | * | 4/2000 | Arai et al. | 369/112.24 |
| 6,545,958 B1 | * | 4/2003 | Hirai et al. | 369/44.32 |
| 7,088,664 B2 | * | 8/2006 | Kim et al. | 369/112.19 |
| 7,801,010 B2 | * | 9/2010 | Maezawa et al. | 369/112.23 |
| 2005/0111516 A1 | | 5/2005 | Hatano et al. | |
| 2008/0130465 A1 | * | 6/2008 | Koreeda et al. | 369/112.03 |
| 2009/0116238 A1 | * | 5/2009 | Zhu et al. | 362/247 |

FOREIGN PATENT DOCUMENTS

| | | |
|---|---|---|
| JP | 2002-15456 | 1/2002 |
| JP | 2005-141872 | 6/2005 |

* cited by examiner

*Primary Examiner* — Joseph Feild
*Assistant Examiner* — Parul Gupta
(74) *Attorney, Agent, or Firm* — Wenderoth, Lind & Ponack, L.L.P.

(57) ABSTRACT

An optical head is provided with a light source for emitting a first laser beam having a first wavelength shorter than 430 nm, a two-wavelength light source for emitting a second laser beam having a second wavelength equal to or longer than 430 nm, a flat beam splitter in the form of a single plate for reflecting the first laser beam emitted from the light source, a wedge prism in the form of a single plate for reflecting the first laser beam reflected by the flat beam splitter and transmitting the second laser beam emitted from the two-wavelength light source, and an objective lens for focusing the first laser beam reflected by the wedge prism on an information recording surface of a BD. The light source is arranged such that the optical axis of the first laser beam emitted from the light source is inclined with respect to that of the second laser beam emitted from the two-wavelength light source. By this construction, the miniaturization of the optical head can be realized.

12 Claims, 21 Drawing Sheets

LIGHT SOURCE SIDE

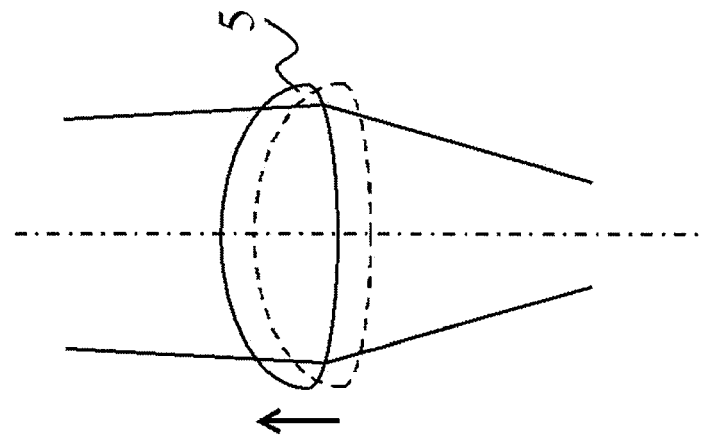
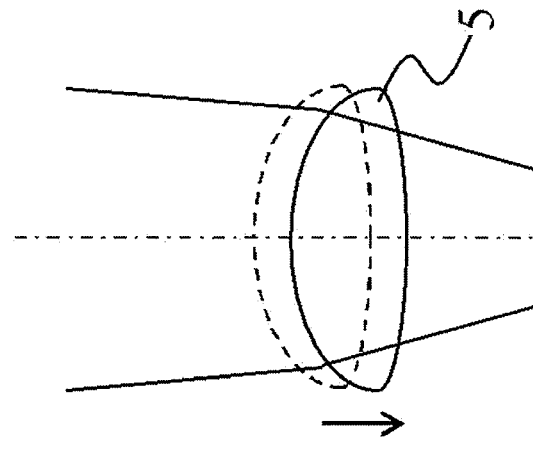
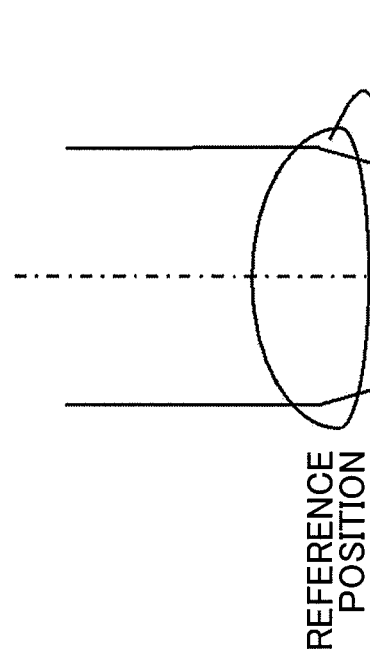

OPTICAL HEAD, OPTICAL DISC DEVICE AND INFORMATION RECORDING AND/OR REPRODUCING DEVICE

BACKGROUND OF THE INVENTION

1. Field of the Invention

The present invention relates to an optical head including a plurality of light sources having different wavelengths and adapted to optically record or reproduce information on or from a plurality of types of information recording media such as optical discs, an optical disc device including such an optical head and an information recording and/or reproducing device including such an optical disc device.

2. Description of the Background Art

In recent years, with the practical use of blue-violet semiconductor lasers, Blu-ray discs (hereinafter, "BDs"), which are optical information recording media (hereinafter, also referred to as "optical discs") having the same size as CDs (Compact Discs) and DVDs (Digital Versatile Discs), high density and large capacity, have been put to practical use. These BDs are optical discs which record or reproduce information using a blue-violet laser light source for emitting blue-violet light having a wavelength of about 400 nm and an objective lens whose numerical aperture (NA) is increased to 0.85 and whose protective substrates are about 0.1 mm in thickness.

Accordingly, there have been proposed compatible optical heads for recording or reproducing information by focusing laser beams of different wavelengths on information recording surfaces of optical discs whose protective substrates differ in thickness using a single or a plurality of objective lenses.

For example, Japanese Unexamined Patent Publication No. 2002-15456 (prior art) discloses an optical head for recording or reproducing information by focusing laser beams of different wavelengths emitted from separate light sources using a single objective lens while causing the optical axes of the laser beams to substantially coincide using a flat beam splitter.

FIG. 22 is a diagram showing the construction of a conventional optical head. In FIG. 22, an optical head 140 is provided with a first light source 101 for emitting a red laser beam, a first flat beam splitter 102, a first auxiliary lens 103, a second flat beam splitter 104, a collimator lens 105, a mirror 107, an objective lens 108, a detection lens 110, a second light source 111 for emitting an infrared laser beam, a second auxiliary lens 112 and a light receiving element 120.

A DVD 70 is an optical disc with a protective substrate having a thickness of 0.6 mm, and a CD 80 is an optical disc with a protective substrate having a thickness of 1.2 mm.

First of all, an operation of the optical head 140 to record or reproduce information on or from the CD 80 is described. An infrared laser beam emitted from the second light source 111 is converted into a divergent beam having a different NA by the second auxiliary lens 112 and reflected by the second flat beam splitter 104. Thereafter, the infrared laser beam is focused as a light spot on an information recording surface of the CD 80 via the protective substrate by the objective lens 108 after being converted into a substantially parallel beam by the collimator lens 105 and reflected by the mirror 107.

The infrared laser beam reflected by the information recording surface of the CD 80 passes through the objective lens 108 again, is reflected by the mirror 107 and converted into a convergent beam by the collimator lens 105. Thereafter, the infrared laser beam passes through the second flat beam splitter 104 and the first flat beam splitter 102, has astigmatism given thereto by the detection lens 110 and is introduced to the light receiving element 120.

Next, an operation of the optical head 140 to record or reproduce information on or from the DVD 70 is described. A red laser beam emitted from the first light source 101 is converted into a divergent beam having a different NA by the first auxiliary lens 103 and reflected by the first flat beam splitter 102. Thereafter, the red laser beam is focused as a light spot on an information recording surface of the DVD 70 via the protecting substrate by the objective lens 108 after passing through the second flat beam splitter 104 and being converted into a substantially parallel beam by the collimator lens 105 and reflected by the mirror 107.

The red laser beam reflected by the information recording surface of the DVD 70 passes through the objective lens 108 again and is reflected by the mirror 107 and converted into a convergent beam by the collimator lens 105. Thereafter, the red laser beam passes through the second flat beam splitter 104 and the first flat beam splitter 102, has astigmatism given thereto by the detection lens 110 and is introduced to the light receiving element 120.

The first flat beam splitter 102 has a spectral characteristic with a transmittance of about 100% and a reflectance of about 0% for infrared laser beams while having a spectral characteristic with a transmittance of about 50% and a reflectance of about 50% for red laser beams.

On the other hand, the second flat beam splitter 104 has a spectral characteristic with a transmittance of about 50% and a reflectance of about 50% for infrared laser beams while having a spectral characteristic with a transmittance of about 100% and a reflectance of about 0% for red laser beams.

Here, an angle of inclination "a" of the second flat beam splitter 104 is set to 35°, an angle of inclination "b" of the first flat beam splitter 102 is set to 45° and the second flat beam splitter 104 is formed thin from a hard material. Thus, astigmatism and coma aberration produced in an optical path up to the optical disc can be suppressed.

The construction of the optical head in which the first and second flat beam splitters 102 and 104 are both formed by parallel plates is disclosed in the above prior art.

However, a spectral characteristic of the flat beam splitter with respect to a polarization direction of an incident laser beam is not described in the prior art at all. In other words, since the flat beam splitters of the prior art are wavelength selecting prisms only specifying the transmittances and reflectances of infrared laser beams and red laser beams, a so-called isolation performance of improving light utilization efficiency by a combination of a wave plate and a polarization beam splitter in the form of a flat plate is not described. Accordingly, problems peculiar to the polarization beam splitter in the form of a flat plate such as incident angle dependency when a laser beam of a specified polarization direction is incident are not mentioned at all. For example, problems such as the one that power necessary for a laser light source increases or a light quantity distribution of a far field pattern of a laser beam incident on an objective lens becomes asymmetric due to insufficient light utilization efficiency, thereby deteriorating recording performance, occur in a recording optical head.

Further, the optical head disclosed in the prior art is an optical head for recording or reproducing information on or from DVDs and CDs. Accordingly, neither disclosure nor indication is made regarding problems peculiar to the optical head for recording or reproducing information on or from high-density optical discs such as BDs using a blue-violet light source such as the construction of the optical head associated with different directions of far field patterns suitable for recording or reproduction between BDs and DVDs and resistance characteristics of lens glass materials against irradiation of blue-violet laser beams. In other words, the construction of the optical head disclosed in the prior art cannot be applied to an optical head for recording or reproducing information on or from high-density optical discs such as BDs.

SUMMARY OF THE INVENTION

In order to solve the above problems, an object of the present invention is to provide an optical head, an optical disc device and an information recording and/or reproducing device which can be miniaturized.

One aspect of the present invention is directed to an optical head, comprising a first light source for emitting a first laser beam having a first wavelength shorter than 430 nm; a second light source for emitting a second laser beam having a second wavelength equal to or longer than 430 nm; a first light reflecting member in the form of a single plate for reflecting the first laser beam emitted from the first light source; a second light reflecting member in the form of a single plate for reflecting the first laser beam reflected by the first light reflecting member and transmitting the second laser beam emitted from the second light source; and an objective lens for focusing the first laser beam reflected by the second light reflecting member on an information recording surface of a first information recording medium, wherein the first light source is arranged such that the optical axis of the first laser beam emitted from the first light source is inclined with respect to that of the second laser beam emitted from the second light source.

BRIEF DESCRIPTION OF THE DRAWINGS

FIG. 9A is a diagram showing an emergent beam when a collimator lens is at a reference position, FIG. 9B is a diagram showing an emergent beam when the collimator lens is moved toward a light source side, FIG. 9C is a diagram showing an emergent beam when the collimator lens is moved toward the objective lens.

DETAILED DESCRIPTION OF THE PREFERRED EMBODIMENTS OF THE INVENTION

Hereinafter, embodiments of the present invention are described with reference to the drawings. It should be noted that the following embodiments are specific examples of the present invention and not of the nature to limit the technical scope of the present invention.

First Embodiment

Figure 1:
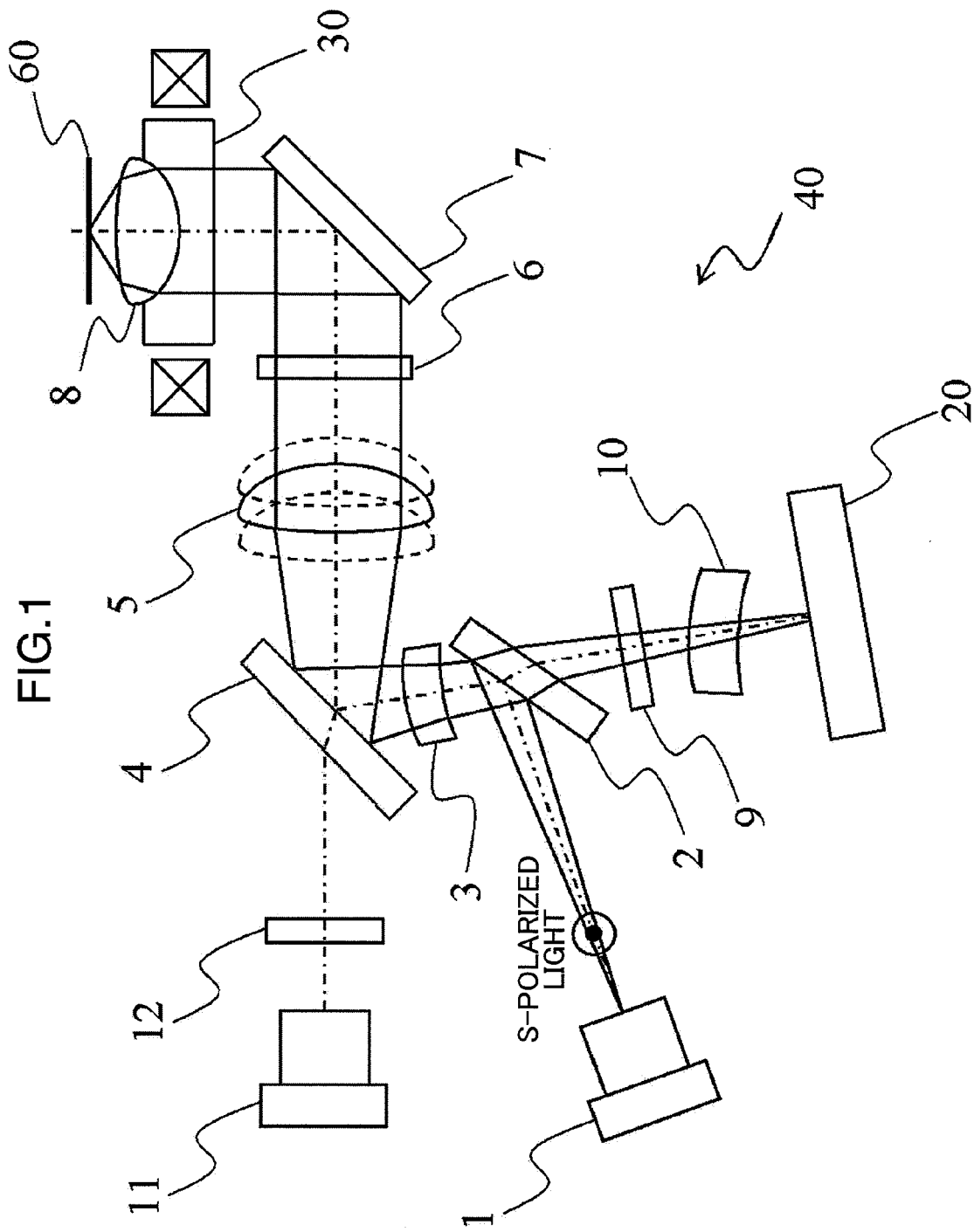
FIG. 1 is a diagram showing a schematic construction of an optical head in the case of recording or reproducing information on or from a BD in a first embodiment of the invention.
Figure 2:
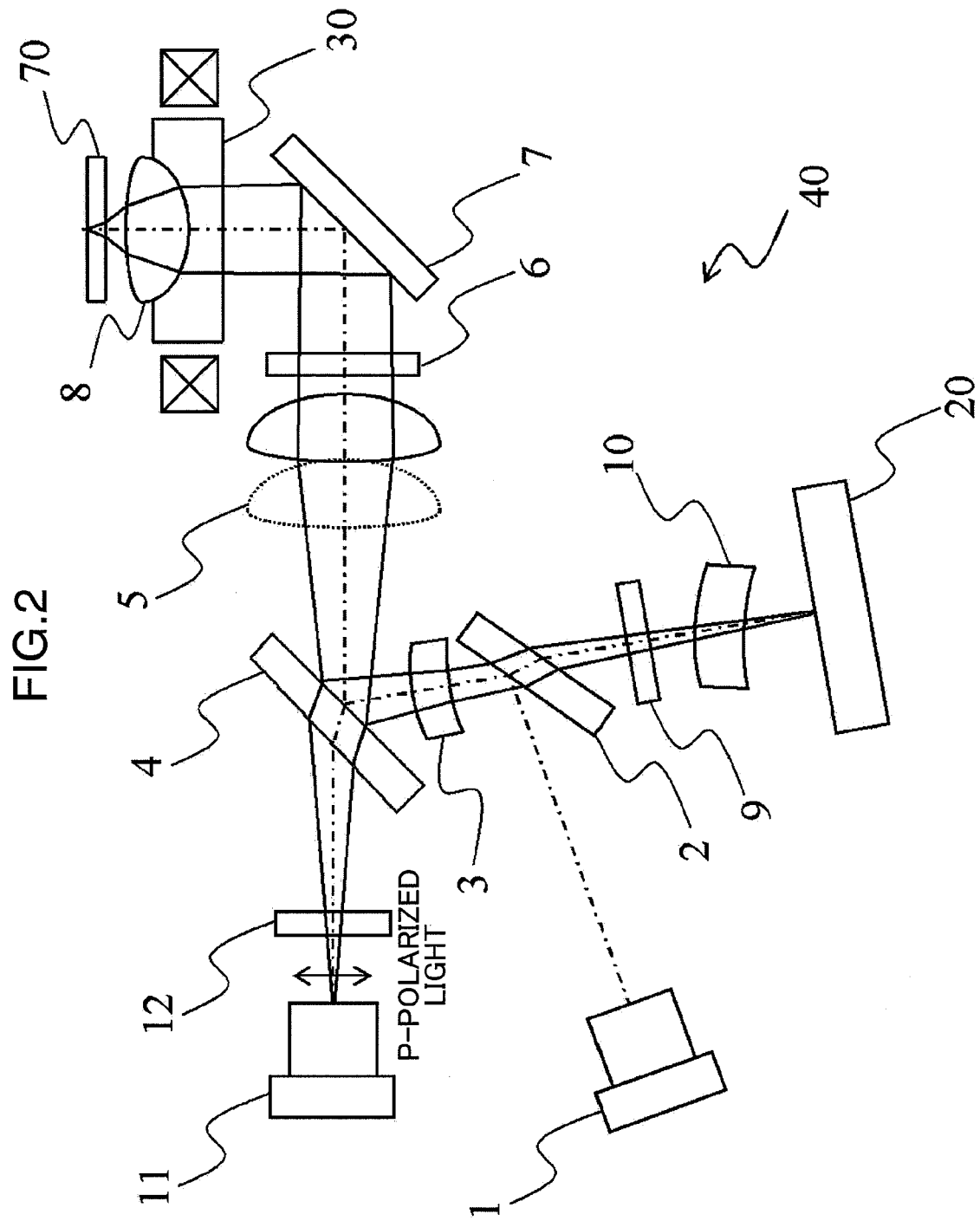
FIG. 2 is a diagram showing a schematic construction of the optical head in the case of recording or reproducing information on or from a DVD in the first embodiment of the invention.
Figure 3:
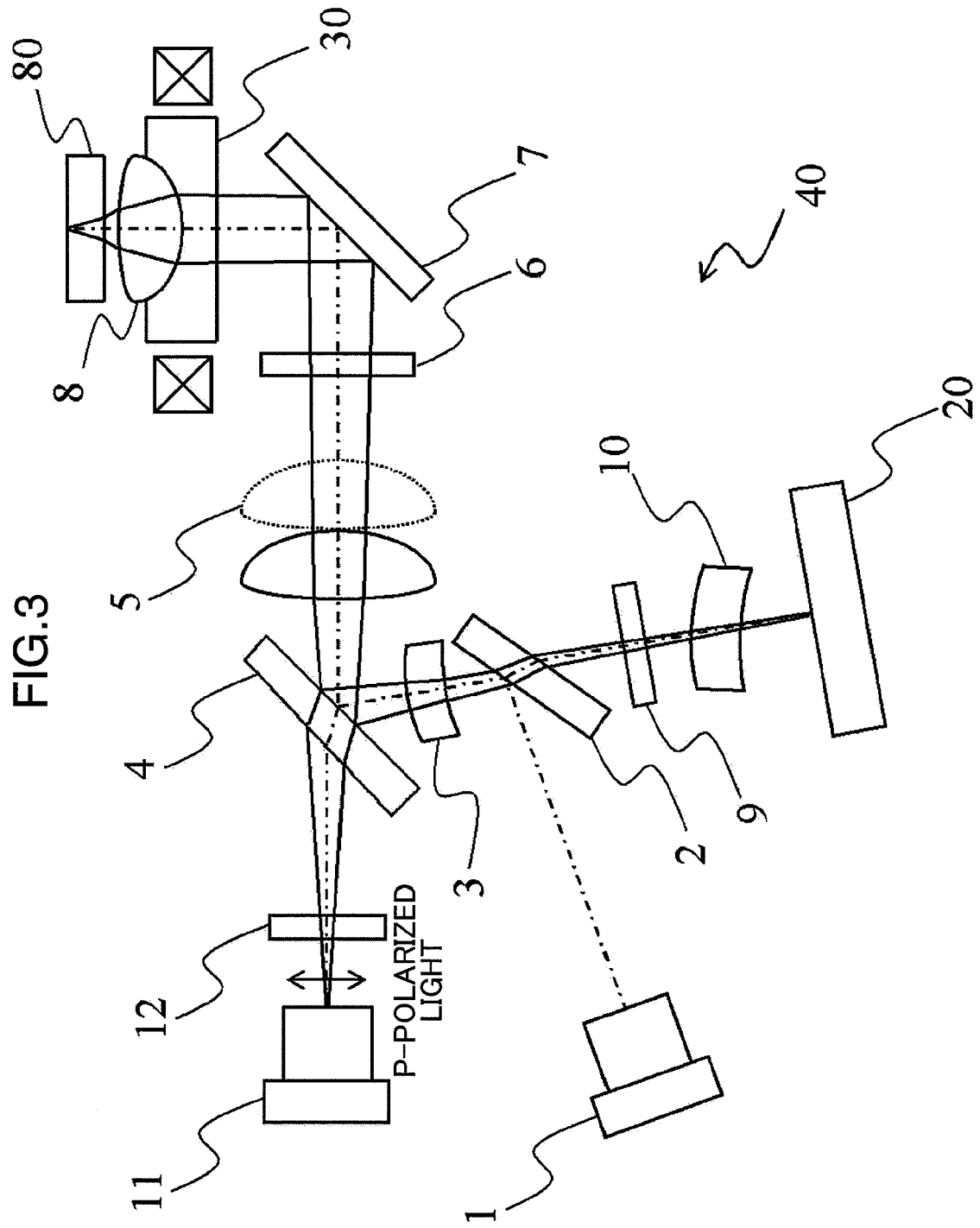
FIG. 3 is a diagram showing a schematic construction of the optical head in the case of recording or reproducing information on or from a CD in the first embodiment of the invention.

First of all, the construction of an optical head is described. FIGS. 1 to 3 are diagrams showing schematic constructions of an optical head in a first embodiment of the present invention. FIG. 1 is a diagram showing the schematic construction of the optical head in the case of recording or reproducing information on or from a BD in the first embodiment of the invention, FIG. 2 is a diagram showing the schematic construction of the optical head in the case of recording or reproducing information on or from a DVD in the first embodiment of the invention, and FIG. 3 is a diagram showing the schematic construction of the optical head in the case of recording or reproducing information on or from a CD in the first embodiment of the invention.

In FIG. 1, an optical head 40 is provided with a light source 1 for emitting a blue-violet laser beam, a flat beam splitter 2 in the form of a single plate, a relay lens 3, a wedge prism 4 in the form of a single plate, a collimator lens 5, a quarter wave plate 6, a mirror 7, an objective lens 8, a detection hologram 9, a detection lens 10, a two-wavelength light source 11 for emitting a red laser beam and an infrared laser beam, a diffraction grating 12, a light receiving element 20 and an objective lens actuator 30.

A BD 60 is an optical disc whose protective substrate is about 0.1 mm in thickness.

The light source 1 emits a first laser beam having a first wavelength shorter than 430 nm. In this embodiment, the light source 1 emits a blue-violet laser beam having a wavelength of 405 nm. The two-wavelength light source 11 emits a second laser beam having a second wavelength equal to or longer than 430 nm and a third laser beam having a third wavelength longer than the second wavelength. In this embodiment, the two-wavelength light source 11 emits a red laser beam having a wavelength of 660 nm and an infrared laser beam having a wavelength of 785 nm.

The light source 1 is arranged such that the optical axis of the blue-violet laser beam emitted from the light source 1 is inclined with respect to that of the red laser beam or infrared laser beam emitted from the two-wavelength light source 11.

The flat beam splitter 2 reflects the blue-violet laser beam emitted from the light source 1. The wedge prism 4 reflects the blue-violet laser beam reflected by the flat beam splitter 2 and transmits the red laser beam and infrared laser beam emitted from the two-wavelength light source 11.

The relay lens 3 is arranged between the flat beam splitter 2 and the wedge prism 4 and converts the blue-violet laser beam into a divergent beam having a different NA. The collimator lens 5 converts the blue-violet laser beam reflected by the wedge prism 4 into a substantially parallel beam and converts the red laser beam or infrared laser beam having passed through the wedge prism 4 into a substantially parallel beam.

The quarter wave plate 6 converts linearly polarized blue-violet laser beam, red laser beam and infrared laser beam into circularly polarized beams and converts circularly polarized blue-violet laser beam, red laser beam and infrared laser beam into linearly polarized beams. The mirror 7 reflects the blue-violet laser beam, red laser beam and infrared laser beam toward the objective lens 8.

The objective lens 8 focuses the blue-violet laser beam reflected by the wedge prism 4 on an information recording surface of the BD 60, focuses the red laser beam having passed through the wedge prism 4 on an information recording surface of the DVD 70 and focuses the infrared laser beam having passed through the wedge prism 4 on an information recording surface of the CD 80.

The detection hologram 9 generates $0^{th}$-order light and $\pm 1^{st}$-order diffracted light from the blue-violet laser beam. The detection lens 10 gives astigmatism to the blue-violet laser beam, red laser beam and infrared laser beam. The diffraction grating 12 separates the red laser beam and infrared laser beam into main beams as $0^{th}$-order light and sub beams as $\pm 1^{st}$-order diffracted light. The light receiving element 20 receives the blue-violet laser beam, red laser beam and infrared laser beam and output signals corresponding to the intensities of the received laser beams. The objective lens actuator 30 drives the objective lens 8 in a focusing direction, a tracking direction and a radial direction of the optical disc.

The light source 1 is arranged such that the blue-violet laser beam is incident substantially in the form of an S-polarized beam on the flat beam splitter 2, and the two-wavelength light source 11 is arranged such that the red laser beam and infrared laser beam are incident substantially in the form of P-polarized beams on the wedge prism 4.

First of all, an operation of the optical head 40 to record or reproduce information on or from the BD 60 is described with reference to FIG. 1. A blue-violet laser beam having a wavelength of 405 nm and emitted from the light source 1 is incident in the form of an S-polarized beam on the flat beam splitter 2. The blue-violet laser beam reflected by the flat beam splitter 2 passes through the relay lens 3 to be converted into a divergent beam having a different NA. The blue-violet laser beam is converted into a substantially parallel beam by the collimator lens 5 after being reflected by the wedge prism 4, and the linearly polarized beam is converted into a circularly polarized beam by the quarter wave plate 6. Then, the blue-violet laser beam is focused as a light spot on the information recording surface of the BD 60 through the protective substrate by the objective lens 8 after being reflected by the mirror 7.

The blue-violet laser beam reflected by the information recording surface of the BD 60 passes through the objective lens 8 again and is reflected by the mirror 7 and converted into a linearly polarized beam different from the one on an outward path by the quarter wave plate 6. Thereafter, the blue-violet laser beam is converted into a convergent beam by the collimator lens 5, reflected by the wedge prism 4 and converted into a convergent beam having a different NA by the relay lens 3. Further, the blue-violet laser beam is incident in the form of a P-polarized beam on the flat beam splitter 2 to pass through it. Then, when the blue-violet laser beam passes through the detection hologram 9, $0^{th}$-order light and $\pm 1^{st}$-order diffracted light are generated therefrom, have astigmatism given thereto by the detection lens 10 and are introduced to the light receiving element 20.

Next, an operation of the optical head 40 to record or reproduce information on or from the DVD 70 is described with reference to FIG. 2. The DVD 70 is an optical disc whose protective substrate is about 0.6 mm in thickness.

In FIG. 2, a red laser beam having a wavelength of 660 nm and emitted from the two-wavelength light source 11 is incident in the form of a P-polarized beam on the wedge prism 4 after being separated into a main beam as $0^{th}$-order light and sub beams as $\pm 1^{st}$-order diffracted light by the diffraction grating 12. The red laser beam having passed through the wedge prism 4 is converted into a slightly convergent beam by the collimator lens 5 and converted from the linearly polarized beam into a circularly polarized beam by the quarter wave plate 6. The red laser beam is focused as a light spot on the information recording surface of the DVD 70 through the protective substrate by the objective lens 8 after being reflected by the mirror 7.

The red laser beam reflected by the information recording surface of the DVD 70 passes through the objective lens 8 again and is converted into a convergent beam by the collimator lens 5 after being reflected by the mirror 7 and converted into a linearly polarized beam different from the one on an outward path by the quarter wave plate 6. The red laser beam is incident in the form of an S-polarized beam on the wedge prism 4 to be reflected, and converted into a convergent beam having a different NA by the relay lens 3. Thereafter, the red laser beam passes through the flat beam splitter 2 and the detection hologram 9 and is introduced to the light receiving element 20 after astigmatism is given thereto by the detection lens 10.

Similarly, an operation of the optical head 40 to record or reproduce information on or from the CD 80 is described with reference to FIG. 3. The CD 80 is an optical disc whose protective substrate is about 1.2 mm in thickness.

In FIG. 3, an infrared laser beam having a wavelength of 785 nm and emitted from the two-wavelength light source 11 is incident in the form of a P-polarized beam on the wedge prism 4 after being separated into a main beam as $0^{th}$-order light and sub beams as $\pm 1^{st}$-order diffracted light by the diffraction grating 12. The infrared laser beam having passed through the wedge prism 4 is converted into a slightly convergent beam having a different NA by the collimator lens 5 and converted from the linearly polarized beam into a circularly polarized beam by the quarter wave plate 6. The infrared laser beam is focused as a light spot on the information recording surface of the CD 80 through the protective substrate by the objective lens 8 after being reflected by the mirror 7.

The infrared laser beam reflected by the information recording surface of the CD 80 passes through the objective lens 8 again and is converted into a convergent beam by the collimator lens 5 after being reflected by the mirror 7 and converted into a linearly polarized beam different from the one on an outward path by the quarter wave plate 6. The infrared laser beam is incident in the form of an S-polarized beam on the wedge prism 4 and converted into a convergent beam having a different NA by the relay lens 3. Thereafter, the infrared laser beam passes through the flat beam splitter 2 and the detection hologram 9 and is introduced to the light receiving element 20 after astigmatism is given thereto by the detection lens 10.

In this embodiment, the blue-violet laser beam corresponds to an example of a first laser beam; the light source 1 to an example of a first light source; the red laser beam to an example of a second laser beam; the two-wavelength light source 11 to an example of a second light source; the flat beam splitter 2 to an example of a first light reflecting member; the wedge prism 4 to an example of a second light reflecting member; the BD 60 to an example of a first information recording medium; the objective lens 8 to an example of an objective lens and the relay lens 3 to an example of a first coupling lens.

Next, focus error signal detection and tracking error signal detection in the optical head of this embodiment are described. A focus error signal used to record or reproduce information on or from the BD 60, DVD 70 and CD 80 is generated using a so-called astigmatism method or the like for detecting a focused spot having astigmatism given thereto by the detection lens 10 by a quartered light receiving pattern in the light receiving element 20.

On the other hand, a tracking error signal is generated by detecting $0^{th}$-order light and $\pm 1^{st}$-order diffracted light generated upon the passage through the detection hologram 9 in a specified light receiving region of the light receiving element 20, for example, for the BD 60. Thus, it is possible to suppress a variation of the tracking error signal produced when there are variations in the position, width and depth of an information track groove formed in the BD 60 and a variation of the tracking error signal produced when information is recorded on the information track to change reflectance. Further, in the BD 60 having a plurality of information recording surfaces, it can be also avoided that unnecessary light (stray light) reflected by an information recording surface different from the one, on or from which information is to be recorded or reproduced, is incident on the light receiving region for detecting the tracking error signal.

Figure 4:
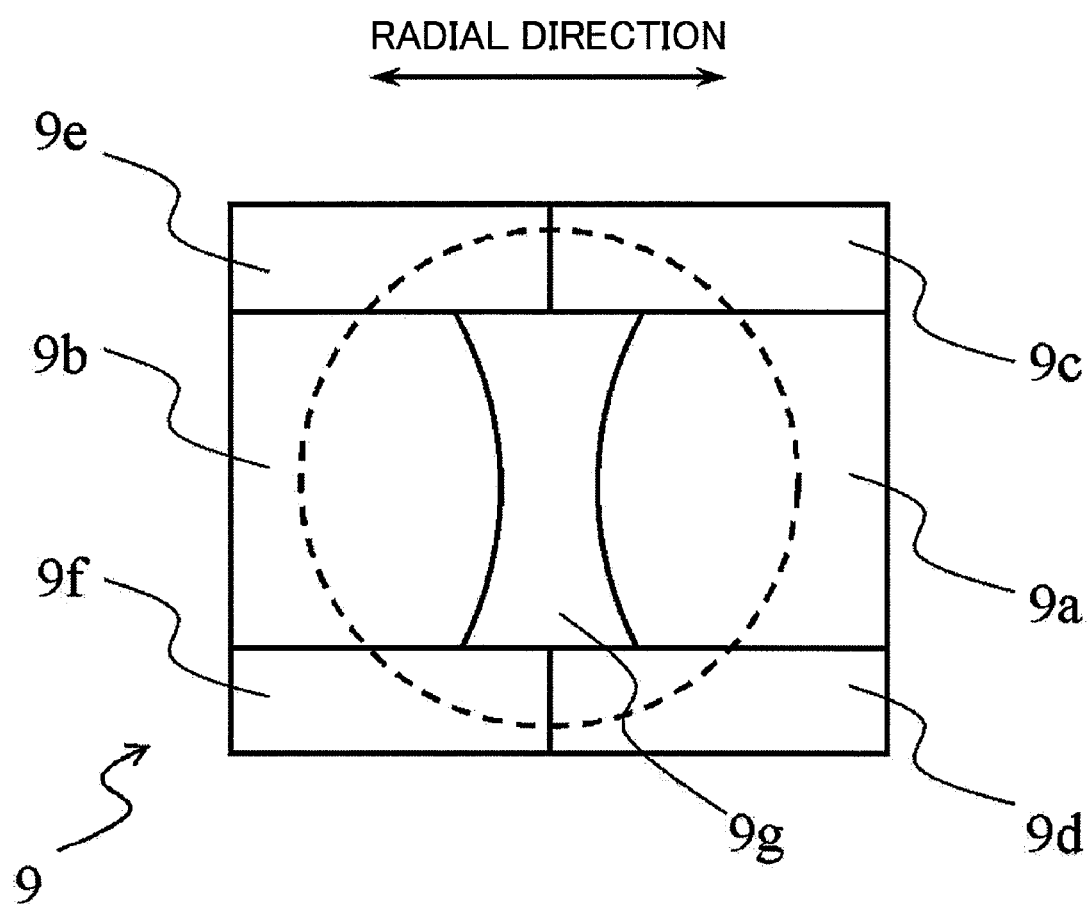
FIG. 4 is a diagram showing an example of a beam separation pattern in a detection hologram.

FIG. 4 is a diagram showing an example of a beam separation pattern in the detection hologram 9. Broken line in FIG. 4 indicates a beam diameter of a laser beam reflected by the information recording surface of the BD 60 on the detection hologram 9. The detection hologram 9 includes seven regions 9a to 9g and separates the laser beam incident in the respective regions into $0^{th}$-order light and $\pm 1^{st}$-order diffracted light.

A tracking error signal TE is obtained by the following equation (1) using current signals Ia to Ig corresponding to light receiving quantities of the $+1^{st}$-order diffracted light diffracted in the respective regions 9a to 9g by the light receiving element 20.

$$TE=(Ia-Ib)-k(Ic+Id-Ie-If) \quad (1)$$

In the DVD 70 and the CD 80, a tracking error signal is detected by a so-called three beam method, differential push-pull method (DPP method) or the like using a main beam and sub beams generated by the diffraction grating 12.

The detections of the focus error signal and the tracking error signal are not limited to these detection methods. For example, even for the BD 60, these signals can be detected using the differential push-pull method (DPP method) using a main beam and sub beams generated by the diffraction grating.

Figure 5B:
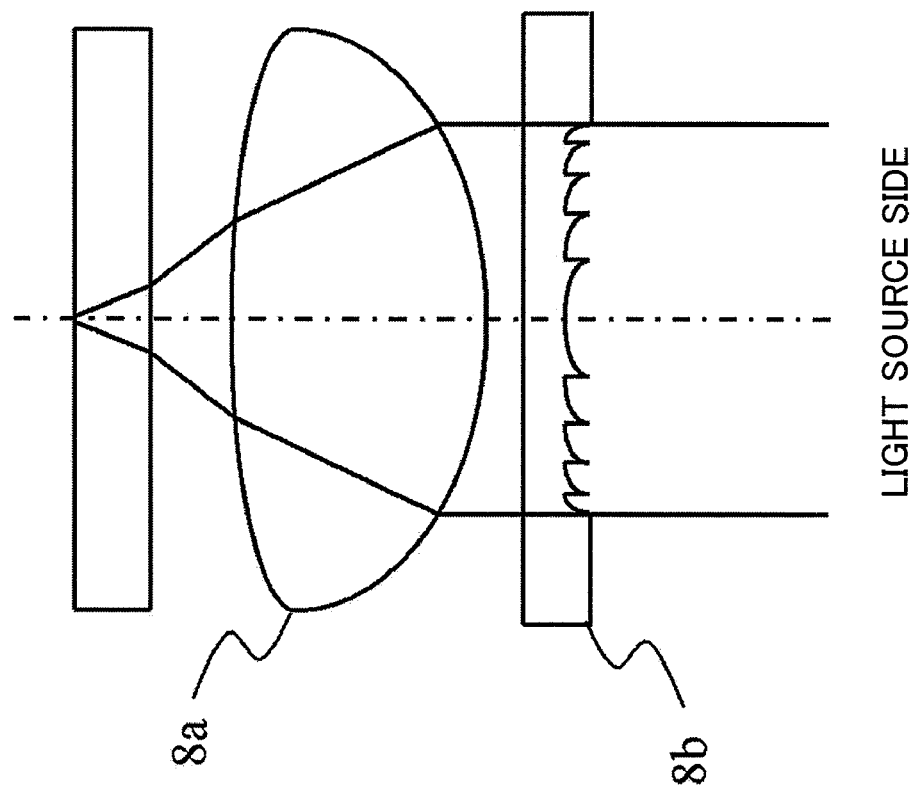
FIG. 5B is a diagram showing the construction of a first modification of the objective lens in the first embodiment of the invention.
Figure 5A:
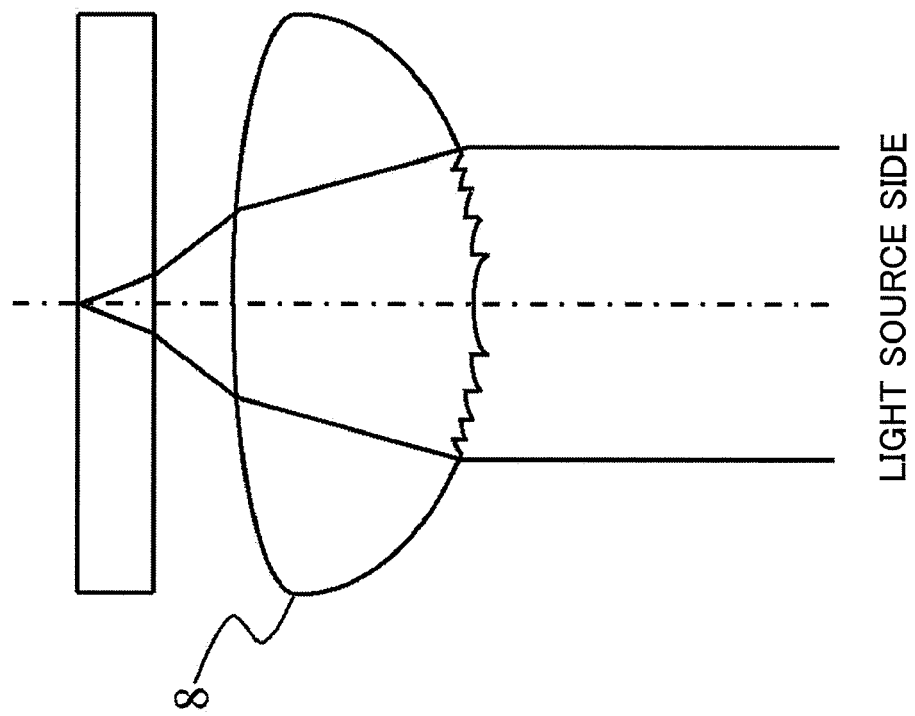
FIG. 5A is a diagram showing the construction of an objective lens in the first embodiment of the invention.
Figure 6:
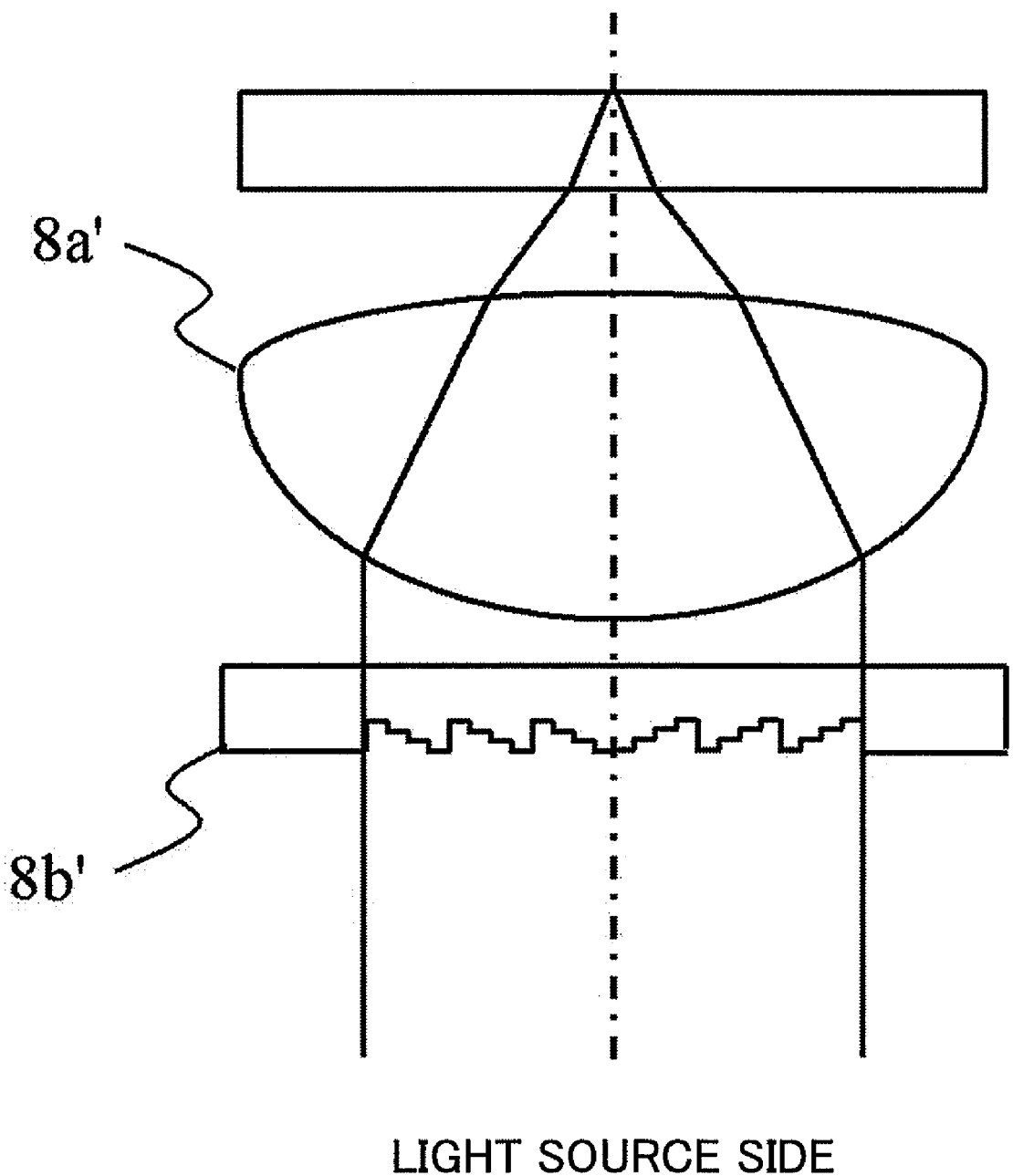
FIG. 6 is a diagram showing the construction of a second modification of the objective lens in the first embodiment of the invention.

Next, a compatible objective lens is described. FIG. 5A is a diagram showing the construction of the objective lens in the first embodiment of the present invention, FIG. 5B is a diagram showing the construction of a first modification of the objective lens in the first embodiment of the present invention, and FIG. 6 is a diagram showing the construction of a second modification of the objective lens in the first embodiment of the present invention.

The objective lens 8 of this embodiment has a diffraction structure for focusing a blue-violet laser beam for recording or reproducing information on or from the BD 60, a red laser beam for recording or reproducing information on or from the DVD 70 and an infrared laser beam for recording or reproducing information on or from the CD 80 into microscopic light spots using wavelength differences.

Specifically, a blazed diffraction structure with a serrated cross section is formed on at least one surface of the objective lens 8, e.g. on an incident surface (surface toward the light source) of the objective lens 8 as shown in FIG. 5A. The blazed diffraction structure applies an aberration correction to the information recording surfaces of the BD 60, DVD 70 and CD 80 where information is recorded or reproduced by laser beams of the respective wavelengths so as to focus the laser beams of the respective wavelengths up to a diffraction limit, coupled with the refractive power of the objective lens 8. The objective lens 8 having the blazed diffraction structure for diffracting a part of incident light in this way can form light spots of diffraction limits on the optical discs whose protective substrates differ in thickness.

The objective lens 8 is designed such that a region for focusing an infrared laser beam on the CD 80 is limited to a lens central part including an optical axis, regions for focusing a red laser beam on the DVD 70 are limited to the lens central part and an intermediate peripheral part outside the lens central part, and the lens central part, the intermediate peripheral part and an outer peripheral part outside the intermediate peripheral part are all used as regions for focusing a blue-violet laser beam on the BD 60. Thus, the NA for the CD 80 is limited to about 0.5, that for the DVD 70 is limited to about 0.65 and that for the BD 60 is enlarged to about 0.85.

Although the objective lens 8 formed with the blazed diffraction structure on the incident surface thereof as shown in FIG. 5A is provided in the optical head of this embodiment, the present invention is not particularly limited thereto and an objective lens 8a having a positive refractive power and a separate hologram lens 8b may be, for example, provided as shown in FIG. 5B. In this case, the objective lens 8a and the hologram lens 8b are integrally driven to record or reproduce information on or from the BD 60, DVD 70 and CD 80. By using such a separate hologram lens 8b, it is not necessary to form the diffraction structure on the incident surface of the objective lens 8 having a large angle of inclination and there is an effect that a mold is easily fabricated. A diffraction structure of the hologram lens 8b is not limited to the one formed on the surface toward the light source as shown in FIG. 5B and may be formed on a surface toward the objective lens 8a or may be formed on both the surface toward the objective lens 8 and the one toward the light source.

Further, the optical head of this embodiment may include an objective lens 8a' having a positive refractive power and a hologram lens 8b' having a stepwise diffraction structure as shown in FIG. 6. In this case, the objective lens 8a' and the hologram lens 8b' are integrally driven. It goes without saying that effects similar to the above are obtained even with such a construction.

It is sufficient that the objective lens can respectively focus a blue-violet laser beam for recording or reproducing information on or from the BD 60, a red laser beam for recording or reproducing information on or from the DVD 70 and an infrared laser beam for recording or reproducing on or from the CD 80 into microscopic light spots, for example, like a refractive objective lens utilizing wavelength dispersion characteristics of a plurality of glass materials. The objective lens is not limited to the one provided with the above diffraction structure.

Figure 7:
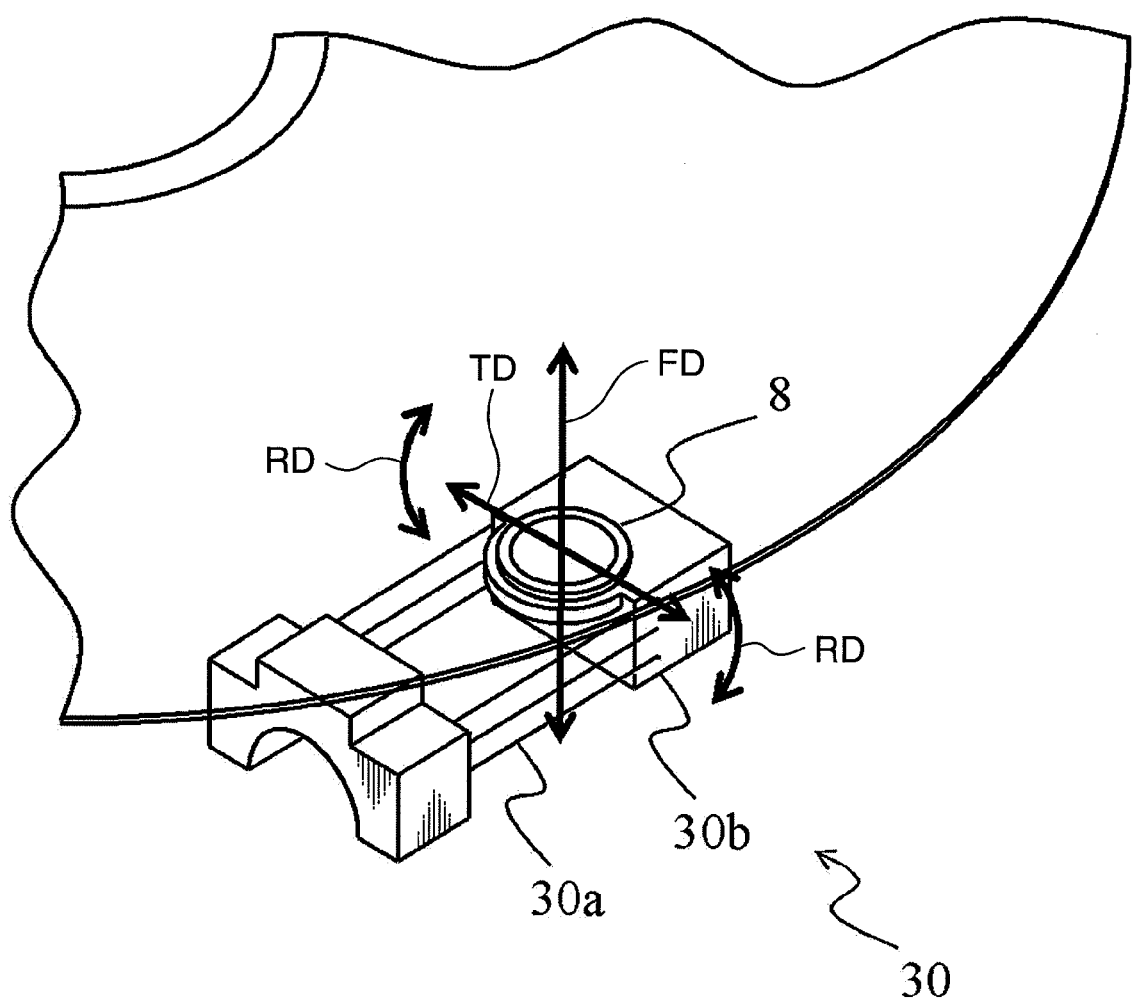
FIG. 7 is a diagram showing the operation of an objective lens actuator in the first embodiment of the invention.

Next, the objective lens actuator in this embodiment is described. FIG. 7 is a diagram showing the construction of the objective lens actuator in the first embodiment of the present invention. As shown in FIG. 7, an objective lens holder 30b (movable portion) for holding the objective lens 8 is supported by a plurality of suspension wires 30a. The objective lens actuator 30 drives the objective lens 8 in a focusing direction FD and a tracking direction TD so that a light spot follows the information track of the rotating optical disc using the above focus error signal and tracking error signal.

Further, the objective lens actuator 30 can also incline the objective lens 8 with respect to a radial direction RD of the optical disc in addition to displacing the objective lens 8 in the focusing direction FD and the tracking direction TD.

Next, a collimator lens actuator in this embodiment is described. The collimator lens 5 can be moved in an optical axis direction thereof by a collimator lens actuator 31.

Figure 8:
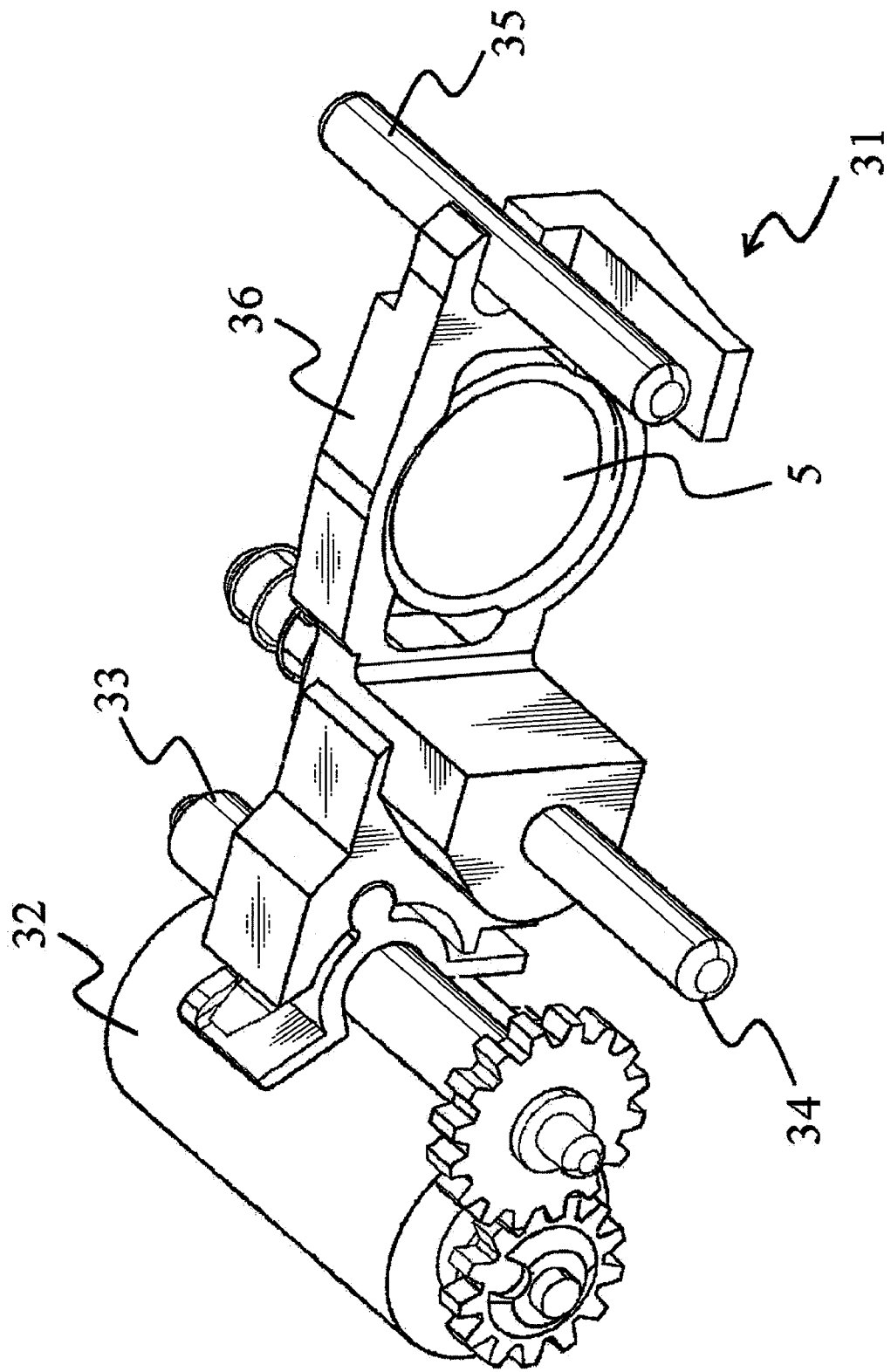
FIG. 8 is a diagram showing the construction of a collimator lens actuator in the first embodiment of the invention.

FIG. 8 is a diagram showing a schematic construction of the collimator lens actuator 31 in the first embodiment of the present invention. In FIG. 8, the collimator lens actuator 31 includes a stepping motor 32, a screw shaft 33, a main shaft 34, a sub shaft 35 and a lens holder 36. By driving the stepping motor 32 to rotate the screw shaft 33, the lens holder 36 holding the collimator lens 5 is moved in the optical axis direction of the collimator lens 5 along the main shaft 34 and the sub shaft 35.

FIG. 9A is a diagram showing an emergent beam when the collimator lens is at a reference position, FIG. 9B is a diagram showing an emergent beam when the collimator lens is moved toward a light source side, and FIG. 9C is a diagram showing an emergent beam when the collimator lens is moved toward the objective lens.

As shown in FIG. 9A, the emergent beam from the collimator lens 5 is a substantially parallel beam if the collimator lens 5 is located at the reference position. In contrast, as shown in FIG. 9B, the emergent light from the collimator lens 5 becomes a divergent beam by moving the collimator lens 5 from the reference position toward the light source side, whereby a spherical aberration produced in the case of thickening the protection substrate of the BD 60 can be corrected. On the other hand, as shown in FIG. 9C, the emergent beam from the collimator lens 5 becomes a convergent beam by moving the collimator lens 5 from the reference position toward the objective lens, whereby a spherical aberration produced in the case of thinning the protection substrate of the BD 60 can be corrected. In other words, spherical aberrations can be corrected by moving the collimator lens 5 according to the thickness of the protective substrate of the respective information recording surfaces in the BD 60 having a plurality of information recording surfaces, whereby recording or reproducing performance can be improved.

Further, the collimator lens actuator 31 of this embodiment causes the red laser beam emitted from the two-wavelength light source 11 to be incident in the form of a convergent beam on the objective lens 8 by moving the collimator lens 5 toward the mirror 7 (toward the objective lens) upon recording or reproducing information on or from the DVD 70 as shown in FIG. 2. On the other hand, upon recording or reproducing information on or from the CD 80 as shown in FIG. 3, the collimator lens 5 is moved toward the two-wavelength light source 11 (toward the light source) so that the infrared laser beam emitted from the two-wavelength light source 11 is incident in the form of a divergent beam on the objective lens 8.

By using the collimator lens actuator 31 in this way, the blue-violet laser beam emitted from the light source 1 and the red and infrared laser beams emitted from the two-wavelength light source 11 can be respectively incident on the objective lens 8 in the form of a parallel beam, a convergent beam or a divergent beam. Accordingly, spherical aberrations produced due to differences in the wavelengths of the respective light sources and in the thicknesses of the protective substrates of the corresponding optical discs can be effectively corrected. In which form of a parallel beam, a convergent beam or a divergent beam the laser beam emitted from each light source is incident on the objective lens 8 depends on the design of the objective lens 8, and the combination of the forms of the respective beams is not limited to the one of this embodiment in which the blue-violet laser beam is converted into a substantially parallel beam, the red laser beam is converted into a convergent beam and the infrared laser beam is converted into a divergent beam.

As shown in FIGS. 1 to 3, the optical head 40 of this embodiment moves the collimator lens 5 toward the mirror 7 at the time of recording or reproducing information on or from the DVD 70 and moves the collimator lens 5 toward the two-wavelength light source 11 at the time of recording or reproducing information on or from the CD 80. A movable range of the collimator lens 5 at this time is sufficiently larger than that of the collimator lens 5 necessary at the time of recording or reproducing information on or from the BD 60. In other words, since a spherical aberration amount correctable at the time of recording or reproducing information on or from the BD 60 is sufficiently large, next-generation BDs including, for example, three or more information recording surfaces and having large thickness range of protective substrates can also be dealt with.

If the movable range of the collimator lens 5 is increased to increase the correctable spherical aberration amount in this way, the optical head inevitably becomes larger. The optical head 40 of this embodiment is so constructed as to move the collimator lens 5 toward the mirror 7 at the time of recording or reproducing information on or from the DVD 70 and move the collimator lens 5 toward the two-wavelength light source 11 at the time of recording or reproducing information on or from the CD 80 in order to effectively correct spherical aberrations in a simple construction using the single objective lens 8. At this time, the movable range of the collimator lens 5 is large as described above. However, since the two-wavelength light source 11 for the DVD 70 and the CD 80 with small optical magnifications are arranged in a moving direction of the collimator lens 5 (tangent direction of the optical disc) in the optical head 40 of this embodiment, there is a merit of allowing the optical head 40 to have a compact construction as compared with the case where the light source 1 for the BD 60 or the light receiving element 20 is arranged in the moving direction of the collimator lens 5.

The construction of the collimator lens actuator 31 for moving the collimator lens 5 in the optical axis direction is not limited to the one using the stepping motor 32 as shown in FIG. 8 and may have any suitable construction, e.g. in the form of an actuator driven by a magnetic circuit or a piezoelectric element. In the construction using the stepping motor 32 shown in FIG. 8, a system can be simplified since the position of the collimator lens 5 in the optical axis direction needs not be monitored. On the other hand, an actuator driven by a magnetic circuit or a piezoelectric element is suitable for the miniaturization of the optical head since it has a small driving part.

Next, the flat beam splitter 2, the wedge prism 4 and the first relay lens 3 in this embodiment are described in detail.

The flat beam splitter 2 has such a coat design as to substantially reflect S-polarized light and substantially transmit P-polarized light of blue-violet laser beams having wavelengths of or about 405 nm. The coat design of the flat beam splitter 2 is also such as to substantially transmit red laser beams having wavelengths of or about 660 nm and infrared laser beams having wavelengths of or about 785 nm independently of polarization directions.

In the optical head 40 of this embodiment, a blue-violet laser beam for recording information on the BD 60 is incident in the form of an S-polarized beam on the flat beam splitter 2 from the light source 1. Accordingly, it is desirable to increase the S-polarized light reflectance of the flat beam splitter 2 in order to ensure light utilization efficiency on an outward path. Here, an incident angle at which the S-polarized light is totally reflected by a boundary surface of materials having different refractive indices (Brewster angle) is expressed by the following equation (2).

$$\theta = \text{Arctan}(n2/n1) \quad (2)$$

In the above equation (2), n1 denotes the refractive index of air and n2 denotes that of the flat beam splitter 2.

For example, if it is assumed that the material of the flat beam splitter 2 is BK7 and the refractive index n2 of the flat beam splitter 2 for a laser beam having a wavelength of 405 nm is 1.530, the Brewster angle $\theta$ is 56.83°. This indicates that, in order to increase the S-polarized light reflectance of the flat beam splitter 2, an incident angle $\theta1$ of the blue-violet laser beam on the flat beam splitter 2 may be approximated to the Brewster angle $\theta$ of 56.83°. On the other hand, reflectance above total reflection cannot be obtained even if the incident angle $\theta1$ exceeds the Brewster angle $\theta$. Here, the larger the incident angle $\theta1$, the larger astigmatism produced in the laser beam having passed through the flat beam splitter 2 and detected by the light receiving element 20. Accordingly, it is not preferable to set the incident angle $\theta1$ larger than the Brewster angle $\theta$. In other words, the incident angle $\theta1$ of the blue-violet laser beam on the flat beam splitter 2 preferably satisfies the following equation (3).

$$\theta1 < \text{Arctan}(n2/n1)[\text{rad}] \quad (3)$$

Figure 10:
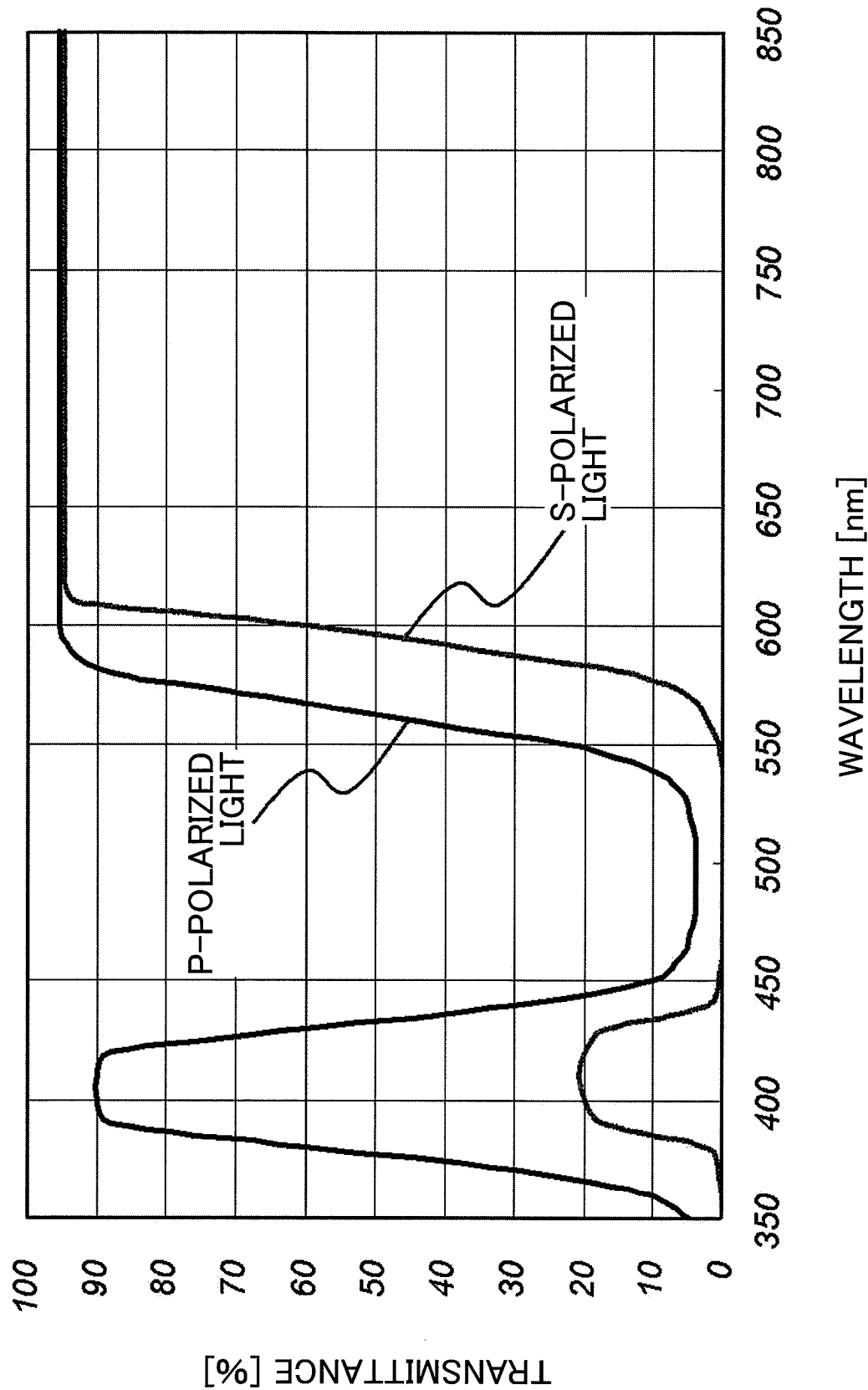
FIG. 10 is a graph showing spectral characteristics of a flat beam splitter of the first embodiment of the invention.

FIG. 10 is a graph showing spectral characteristics of the flat beam splitter 2 of the first embodiment of the present invention. In FIG. 10, a horizontal axis represents the wavelength of a laser beam incident on the flat beam splitter 2 and a vertical axis represents transmittance in relation to wavelength. It should be noted that the incident angle $\theta1$ on the flat beam splitter 2 is 50°. From FIG. 10, S-polarized light reflectance is about 80%, S-polarized light transmittance is about 20% and P-polarized light transmittance is about 90% for a blue-violet laser beam having a wavelength of or near 405 nm. On the other hand, transmittance is about 95% for a red laser beam having a wavelength of or about 660 nm and an infrared laser beam having a wavelength of or about 785 nm independently of polarization directions.

Next, the wedge prism 4 is described. The wedge prism 4 has such a coat design as to transmit parts of a red laser beam having a wavelength of or about 660 nm and an infrared laser beam having a wavelength of or about 785 nm and reflect the other parts thereof. The coat design of the wedge prism 4 is also such as to substantially reflect a blue-violet laser beam having a wavelength of or about 405 nm independently of a polarization direction.

Figure 11:
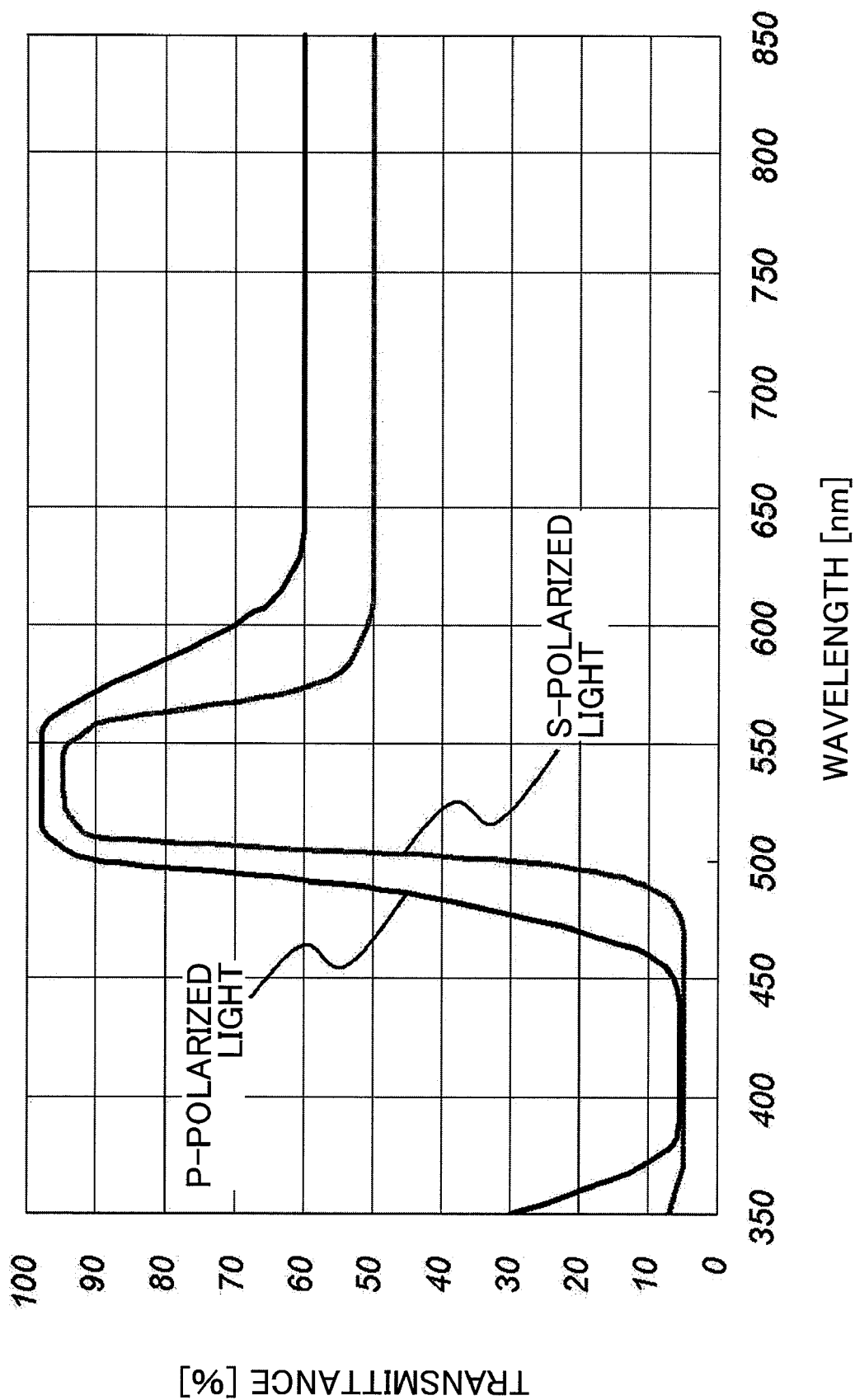
FIG. 11 is a graph showing spectral characteristics of a wedge prism of the first embodiment of the invention.

FIG. 11 is a graph showing spectral characteristics of the wedge prism 4 of the first embodiment of the present invention. In FIG. 11, a horizontal axis represents the wavelength of a laser beam incident on the wedge prism 4 and a vertical axis represents transmittance in relation to wavelength. It should be noted that an incident angle $\theta2$ of the blue-violet laser beam on the wedge prism is 40°. From FIG. 11, P-polarized light transmittance is about 60%, S-polarized light transmittance is about 50% and S-polarized light reflectance is about 50% for a red laser beam having a wavelength of or about 660 nm and an infrared laser beam having a wavelength of or about 785 nm. On the other hand, reflectance is about 95% for a blue-violet laser beam having a wavelength of or about 405 nm independently of a polarization direction.

Since the flat beam splitter 2 and the wedge prism 4 of this embodiment respectively have spectral characteristics shown in FIGS. 10 and 11, light utilization efficiency of the blue-violet laser beam for recording or reproducing information on or from the BD 60 on an outward path to have the S-polarized light reflected by the flat beam splitter 2 and light utilization efficiency thereof on a return path to have the P-polarized light transmitted through the flat beam splitter 2 can be both improved.

On the other hand, light utilization efficiency of the red and infrared laser beams for recording or reproducing information on or from the DVD 70 and the CD 80 on outward paths to have the P-polarized light transmitted by the wedge prism 4 and light utilization efficiency thereof on return paths to have the S-polarized light reflected by the wedge prism 4 can be both increased to relative high levels. Since a difference between the S-polarized light reflectance and the P-polarized light reflectance of the wedge prism 4 and a difference between the S-polarized light transmittance and the P-polarized light transmittance of the flat beam splitter 2 are small, a variation of a signal light quantity (received light quantity detected by the light receiving element 20) caused by the birefringence of the optical disc can be suppressed.

Since the red and infrared laser beams emitted from the two-wavelength light source 11 are divergent beams, astigmatism and coma aberration are produced upon passing through a parallel plate inclined with respect to optical axes and no sufficient performance can be obtained for the light spots on the optical discs focused by the objective lens 8. Accordingly, in the wedge prism 4 of this embodiment, a specified angle (apex angle $\alpha$) is defined between an incident surface 4a and an emergent surface 4b and this apex angle $\alpha$, the incident angle $\theta2$ of the blue-violet laser beam on the wedge prism 4 and an incident angle $\theta3$ of the red or infrared laser beam on the wedge prism 4 are defined to have a specified relationship as shown in FIG. 12.

Figure 12:
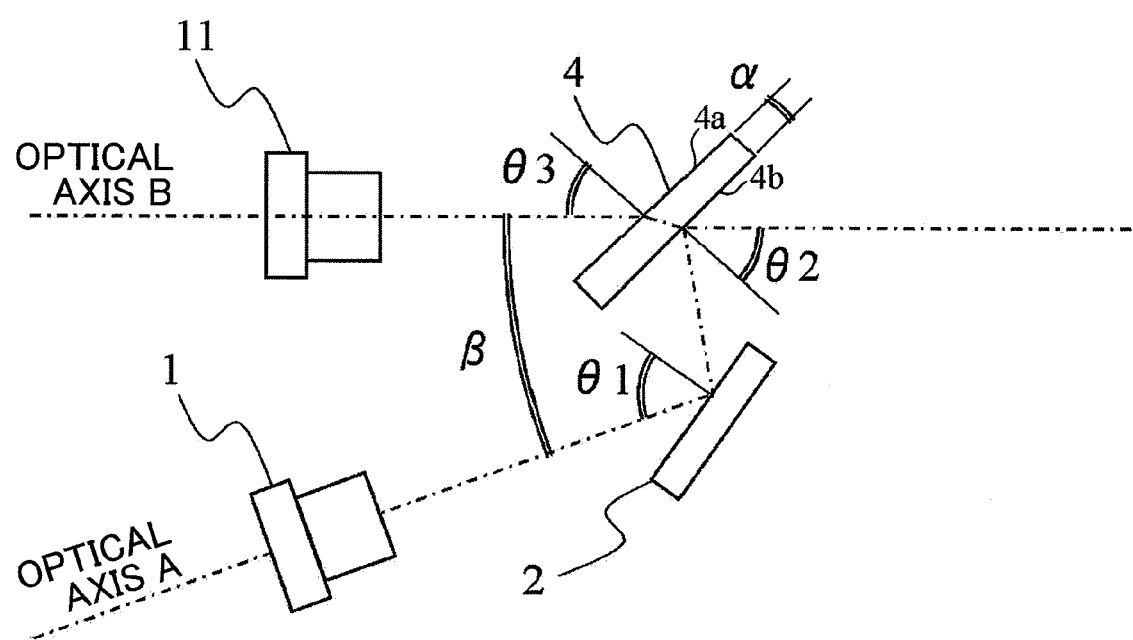
FIG. 12 is a diagram showing an angle between the optical axis of a blue-violet laser beam and that of a red laser beam and incident angles of the blue-violet laser beam on the flat beam splitter and the wedge prism in the first embodiment of the invention.

FIG. 12 is a diagram showing an angle between the optical axis of the blue-violet laser beam and that of the red laser beam and incident angles of the blue-violet laser beam on the flat beam splitter and the wedge prism. In this embodiment, the incident surface 4a corresponds to an example of a first surface and the emergent surface corresponds to an example of a second surface.

For example, in this embodiment, the glass material of the wedge prism 4 is BK7, the apex angle α of the wedge prism 4 is 0.9°, thickness T of a middle part of the wedge prism 4 is 1.0 mm, the incident angle θ3 of the red laser beam is 42.2° and an emergent angle of the red laser beam (incident angle θ2 of the blue-violet laser beam) is 40.6°. In this case, third-order astigmatism and third-order coma aberration when the red laser beam having passed through the wedge prism 4 is focused by the collimator lens 5 and the objective lens 8 are both substantially zero.

In the optical head of this embodiment, the incident angle (=emergent angle) θ1 of a chief ray of the blue-violet laser beam on the flat beam splitter 2 satisfies the following equation (4) and the incident angle (=emergent angle) θ2 of the chief ray of the blue-violet laser beam on the wedge prism 4 satisfies the following equation (5).

$$\pi/4 < \theta1 < \text{Arctan}(n2/n1)[\text{rad}] \quad (4)$$

$$\pi/4 > \theta2[\text{rad}] \quad (5)$$

Accordingly, an angle β between the optical axis A of the blue-violet laser beam emitted from the light source 1 and that B of the red laser beam emitted from the two-wavelength light source 11 is defined as follows.

$$\beta = 2 \times (\theta1 - \theta2) \neq 0$$

For example, since θ1=50° and θ2=40.6° in this embodiment, β=18.8°. In other words, since the optical axes A and B are not parallel, but form the specified angle β therebetween, the spacing between the flat beam splitter 2 and the wedge prism 4 can be made smaller than that between the light source 1 and the two-wavelength light source 11 and the optical elements can be arranged in a more compact manner. Therefore, the optical head 40 can be miniaturized.

In this way, the wedge prism 4 has the incident surface 4a, on which the red laser beam is incident, and the emergent surface 4b, which faces the incident surface 4a and from which the red laser beam is emitted, and the incident surface 4a and the emergent surface 4b are not parallel. By setting the incident surface 4a, on which the red laser beam is incident, and the emergent surface 4b, from which the red laser beam is emitted, not parallel and inclining the incident surface 4a and the emergent surface 4b at specified angles in the wedge prism 4, third-order astigmatism and third-order coma aberration produced when the red laser beam having passed through the wedge prism 4 are focused by the objective lens 8 can be both reduced.

Figure 13:
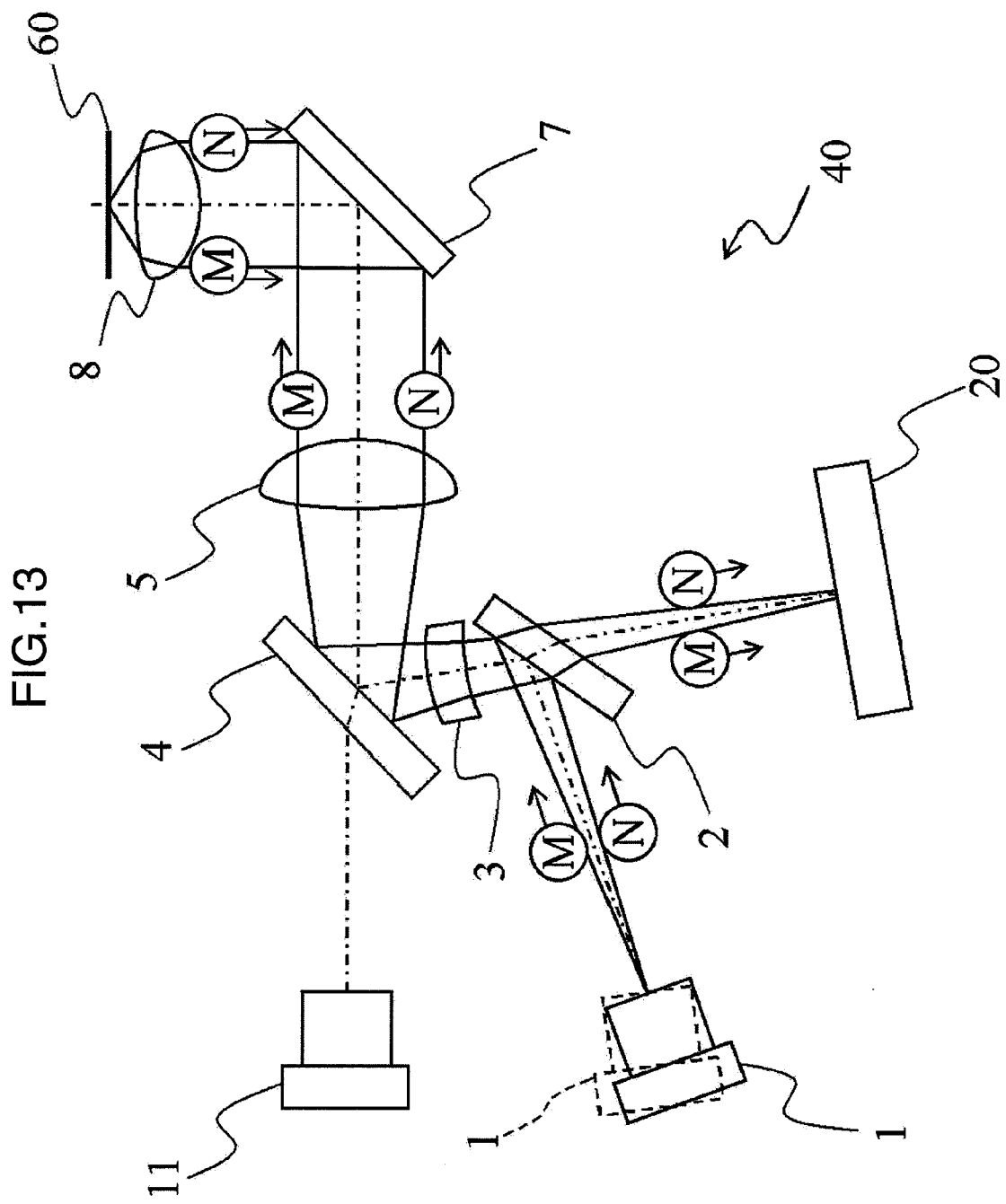
FIG. 13 is a diagram showing incident angle dependency of reflectance of the flat beam splitter and the arrangement of light sources in the first embodiment of the invention.

FIG. 13 is a diagram showing incident angle dependency of the reflectance of the flat beam splitter and the arrangement of the light sources in the first embodiment of the present invention. As described above, the S-polarized light reflectance of the flat beam splitter 2 increases as the incident angle θ1 approaches the Brewster angle θ. Thus, marginal rays have incident angles different from that of a chief ray if a divergent beam is incident on the flat beam splitter 2 as in this embodiment.

For example, since an incident angle of a marginal ray M of a blue-violet laser beam emitted from the light source 1 is larger than that of a chief ray thereof shown by dashed-dotted line as shown in FIG. 13, the reflectance of the marginal ray M by the flat beam splitter 2 is larger than that of the chief ray. Further, since an incident angle of a marginal ray N is smaller than that of the chief ray, the reflectance of the marginal ray N by the flat beam splitter 2 is smaller than that of the chief ray.

The marginal ray M indicates a marginal ray passing at a side toward the two-wavelength light source 11 in a plane including the optical axis of the blue-violet laser beam emitted from the light source 1 and that of a red laser beam emitted from the two-wavelength light source 11 out of the blue-violet laser beam emitted from the light source 1, and the marginal ray N indicates a marginal ray passing at a side of the chief ray opposite to the marginal ray M. The marginal ray M is a ray with a maximum incident angle on the flat beam splitter 2, whereas the marginal ray N is a ray with a minimum incident angle on the flat beam splitter 2.

Accordingly, a light quantity distribution of a far field pattern (hereinafter, also referred to as FFP) of the blue-violet laser beam after being reflected by the flat beam splitter 2 is asymmetric with respect to the optical axis unlike a light quantity distribution of the FFP of the blue-violet laser beam before being reflected by the flat beam splitter 2. This asymmetry of the light quantity distribution depends on the NA of the laser beam incident on the flat beam splitter 2 and, as the NA of the laser beam incident on the flat beam splitter 2 decreases, incident angle differences among the chief ray, the marginal ray (M) and the marginal ray (N) become smaller. Hence, the asymmetry of the light quantity distribution is suppressed.

If optical magnification=focal length (fcl) of the collimator lens/focal length (fol) of the objective lens, optical magnification suitable for recording or production of information on or from the BD 60 is, for example, 12× and the one suitable for recording or reproduction of information on or from the DVD 70 and CD 80 is, for example, 6×. In this way, the optical magnification suitable for recording or production of information on or from the BD 60 and the one suitable for recording or reproduction of information on or from the DVD 70 and CD 80 largely differ.

Here, in the optical head 40 of this embodiment, the objective lens 8 and the collimator lens 5 are commonly used in the recording or reproduction of information on or from the BD 60, DVD 70 and CD 80. At this time, a lens having a specified power (i.e. relay lens) may be inserted between at least one of the light source 1 and the two-wavelength light source 11 and the collimator lens 5 to adjust an apparent focal length of the collimator lens 5 (combined focal length of the collimator lens 5 and the relay lens) in order to set the optical magnification to the above specified value. For example, a relay lens having the power of a convex lens may be inserted between the light source and the collimator lens 5 in order to reduce the focal length of the collimator lens 5 and a relay lens having the power of a concave lens may be inserted between the light source and the collimator lens 5 in order to increase the focal length of the collimator lens 5.

Here, the optical head 40 of this embodiment includes the relay lens 3 having the power of a concave lens between the flat beam splitter 2 and the wedge prism 4, and the relay lens 3 converts the NA of the blue-violet laser beam reflected by the flat beam splitter 2. In the case of arranging the relay lens 3 in this way, the NA of the blue-violet laser beam incident on the flat beam splitter 2 becomes relatively smaller and the asymmetry of the light quantity distribution can be suppressed as compared with the case where the relay lens 3 is arranged between the light source 1 and flat beam splitter 2.

Since the relay lens 3 is arranged between the flat beam splitter 2 and the wedge prism 4, a laser light quantity per unit area of the blue-violet laser beam irradiated on the relay lens 3 becomes relatively smaller as compared with the case where the relay lens 3 is arranged between the light source 1 and the flat beam splitter 2. It becomes easier to make the relay lens 3 of a resin material having lower resistance against the irradiation of the blue-violet laser beam as compared with glass material, but inexpensively moldable.

In order to reduce cross-talk from another information recording surface to the information recording surface to have information recorded or reproduced thereon or therefrom, the detection lens 10 needs not have a large concave lens power even in the case of setting a large detection magnification since the relay lens 3 having the power of the concave lens is arranged between the collimator lens 5 and the detection lens 10 in the optical head 40 of this embodiment. Therefore, the radius of curvature of the detection lens 10 can be increased and the detection lens 10 can be inexpensively formed.

Since the relay lens 3 having the power of the concave lens is arranged between the flat beam splitter 2 and the wedge prism 4, the optical magnification of the blue-violet laser beam can be increased with the focal length of the collimator lens 5 kept short. Since an amount of spherical aberration correctable by moving the collimator lens 5 from the reference position at the time of recording or reproducing information on or from the BD 60 is inversely proportional to the square of the focal length of the collimator lens 5, the movable range of the collimator lens 5 can be made smaller and the optical head 40 can be miniaturized by making the focal length of the collimator lens 5 shorter. On the other hand, since the relay lens 3 is arranged between the flat beam splitter 2 and the wedge prism 4 in this embodiment, the combined focal length of the collimator lens 5 and the relay lens 3 is long even if the focal length of the collimator lens 5 is short. Thus, the blue-violet laser beam reflected by the BD 60 can be introduced to the light receiving element 20 arranged before the flat beam splitter 2.

The marginal ray M shown in FIG. 13 has a larger transmittance because of a smaller incident angle than the chief ray when being reflected by the BD 60 and passes through the flat beam splitter 2, and the marginal ray N has a smaller transmittance because of a larger incident angle than the chief ray when being reflected by the BD 60 and passes through the flat beam splitter 2. In other words, the light quantity distribution of the blue-violet laser beam is constantly asymmetric in such a direction as to increase the light quantity at the side of the marginal ray M both when the blue-violet laser beam is focused as a light spot on the information recording surface of the BD 60 and when the blue-violet laser beam is reflected by the information recording surface of the BD 60 and detected by the light receiving element 20. In order to suppress the asymmetry of such a light quantity distribution, it is preferable to arrange the light source 1 while inclining it at a specified angle in a direction to equalize the light quantity distribution of the FFP as shown by broken line in FIG. 13.

For example, if it is assumed that the optical magnification on the BD 60 is 12×, a divergent angle of the blue-violet laser beam in a radial direction is 20° and a divergent angle of the blue-violet laser beam in a tangent direction is 10° in the optical head 40 of this embodiment, light intensity of the marginal ray (rim intensity) in the radial direction of the optical disc is 89%. Here, if it is assumed that the reflectance of the flat beam splitter 2 for the marginal ray M whose incident angle becomes larger is 85% and that of the flat beam splitter 2 for the marginal ray N whose incident angle becomes smaller is 75%, a ratio of the reflectance for the marginal ray N to that for the marginal ray M is 88%. In this case, the rim intensity of the marginal ray M becomes 84% and that of the marginal ray N becomes 94% by inclining the light source 1 by 1.0° beforehand, whereby the light intensities of the marginal rays M and N after being reflected by the flat beam splitter 2 become substantially equal.

On the other hand, if it is assumed that the transmittance of the flat beam splitter 2 for the marginal ray M on a return path after being reflected by the BD 60 is 95% and the transmittance of the flat beam splitter 2 for the marginal ray N on the return path through the flat beam splitter 2 is 85%, a ratio of the light intensity of the marginal ray N to that of the marginal ray M after being reflected by the BD 60 and passing through the flat beam splitter 2 is 79%. In this case, the rim intensity of the marginal ray M becomes 77% and that of the marginal ray N becomes 97% by inclining the light source 1 by 2.1° beforehand, whereby the light intensities of the marginal rays M and N after passing through the flat beam splitter 2 become substantially equal.

As described above, the light quantity distribution of the FFP can be equalized by inclining the light source 1 by a specified angle beforehand. An angle of inclination of the light source 1 depends on the optical magnification of the optical disc, the divergent angle of the laser beam and the reflectance and/or transmittance of the flat beam splitter 2. In the optical head for recording or reproducing information on or from the BD 60, this angle of inclination is preferably substantially set to equal to or larger than 0.5° and equal to or smaller than 3.0°.

In this way, the light source 1 is arranged at a position inclined by the specified angle in the direction to equalize the light quantity distribution of the far field pattern with respect to the optical axis of the blue-violet laser beam reflected by the flat beam splitter 2 in the plane including the optical axis of the blue-violet laser beam emitted from the light source 1 and that of the red laser beam emitted from the two-wavelength light source 11. Further, the angle of inclination of the light source 1 is determined based on the optical magnification of the optical disc, the divergent angle of the laser beam and the reflectance and/or transmittance of the flat beam splitter 2. Thus, the light quantity distribution of the far field pattern can be equalized and information recording and reproducing accuracies can be improved.

Next, the polarization directions of the laser beams in this embodiment are described. The BD 60 of this embodiment can obtain good recording or reproducing performance by focusing a light spot with a high rim intensity in the radial direction of the optical disc.

The flat beam splitter 2 of this embodiment has such a coat design as to substantially reflect S-polarized light and substantially transmit P-polarized light for a blue-violet laser beam having a wavelength of or about 405 nm (see FIG. 10). Here, in the optical head 40 of this embodiment, the light source 1 is arranged such that the S-polarized light is incident on the flat beam splitter 2 as shown in FIG. 1, i.e. the reflectance of the flat beam splitter 2 is increased. Thus, a FFP with a large rim intensity in the radial direction of the optical disc can be obtained, wherefore the half wave plate for rotating the polarization direction of the blue-violet laser beam is unnecessary.

Since the light source 1 is arranged such that the S-polarized light is incident on the flat beam splitter 2 in this way, a far field pattern with a large rim intensity in the radial direction of the optical disc can be obtained and the half wave plate for rotating the polarization direction of the blue-violet laser beam is unnecessary, whereby the number of parts of the optical head can be reduced.

On the other hand, the DVD 70 of this embodiment can obtain good recording or reproducing performance by focusing a light spot with a large rim intensity in the tangent direction of the optical disc.

The wedge prism 4 of this embodiment has such a coat design as to transmit P-polarized light and reflect S-polarized light for a red laser beam having a wavelength of or about 660 nm (see FIG. 11). Here, in the optical head 40 of this embodiment, the two-wavelength light source 11 is arranged such that the P-polarized light is incident on the wedge prism 4 as shown in FIG. 2, i.e. the transmittance of the wedge prism 4 is increased. Thus, a FFP with a large rim intensity in the tangent direction of the optical disc can be obtained, wherefore the half wave plate for rotating the polarization direction of the red laser beam is unnecessary.

Figure 14:
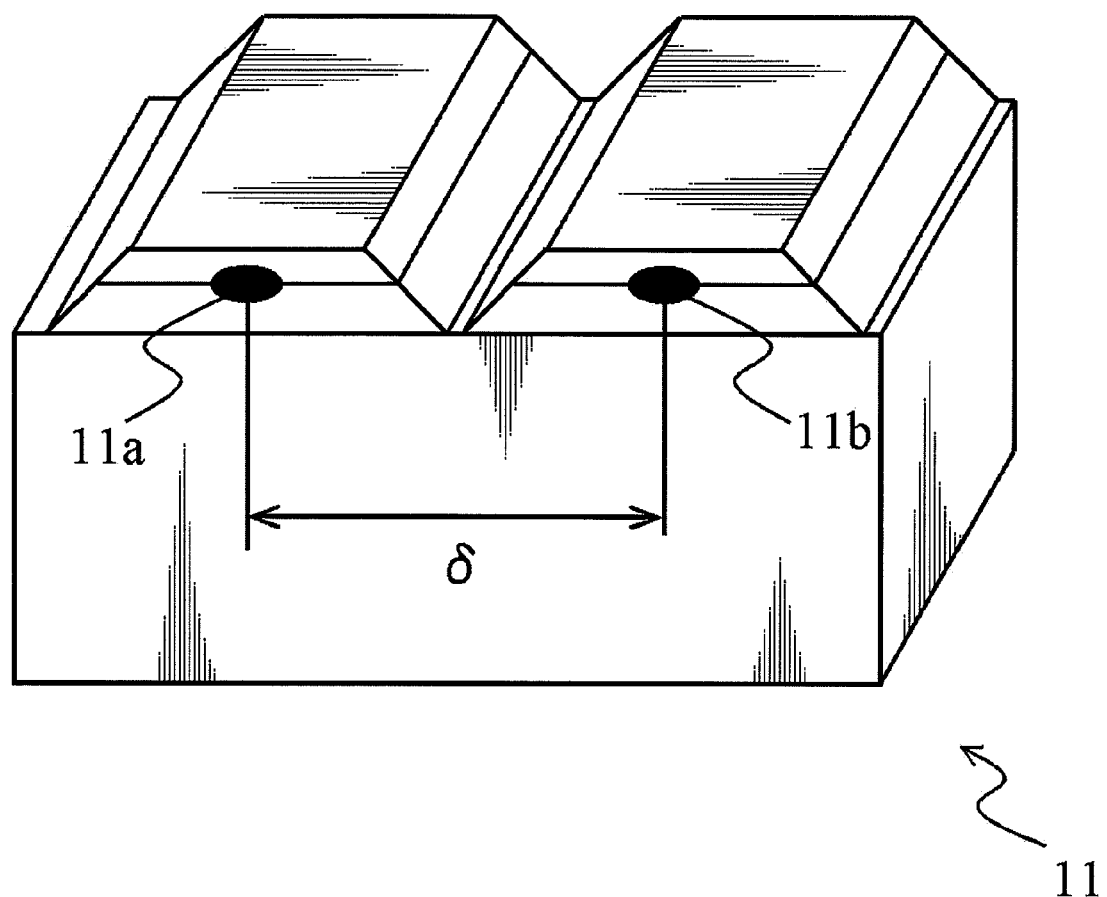
FIG. 14 is a diagram showing the construction of a two-wavelength light source of the first embodiment of the invention.

Next, a second relay lens in this embodiment is described. FIG. 14 is a diagram showing the construction of the two-wavelength light source of the first embodiment of the present invention. The general two-wavelength light source 11 is such that an emitting point 11a of a red laser beam is offset from an emitting point 11b of an infrared laser beam as shown in FIG. 14. Thus, at least one of the red laser beam and the infrared laser beam is incident off-axis on the objective lens 8, wherefore third-order coma aberration is produced in some cases.

Here, in the optical head 40 of this embodiment, the two-wavelength light source 11 is arranged such that P-polarized light is incident on the wedge prism 4. Thus, for example, in the case of arranging the two-wavelength light source 11 such that the optical axis of the red laser beam and that of the objective lens 8 coincide, third-order coma aberration caused by the off-axis incidence of the infrared laser beam on the objective lens 8 is produced in the radial direction of the optical disc. Accordingly, the third-order coma aberration of the infrared laser beam produced by the off-axis incidence can be corrected by inclining the objective lens 8 mounted in the objective lens actuator 30 in the radial direction.

Figure 15:
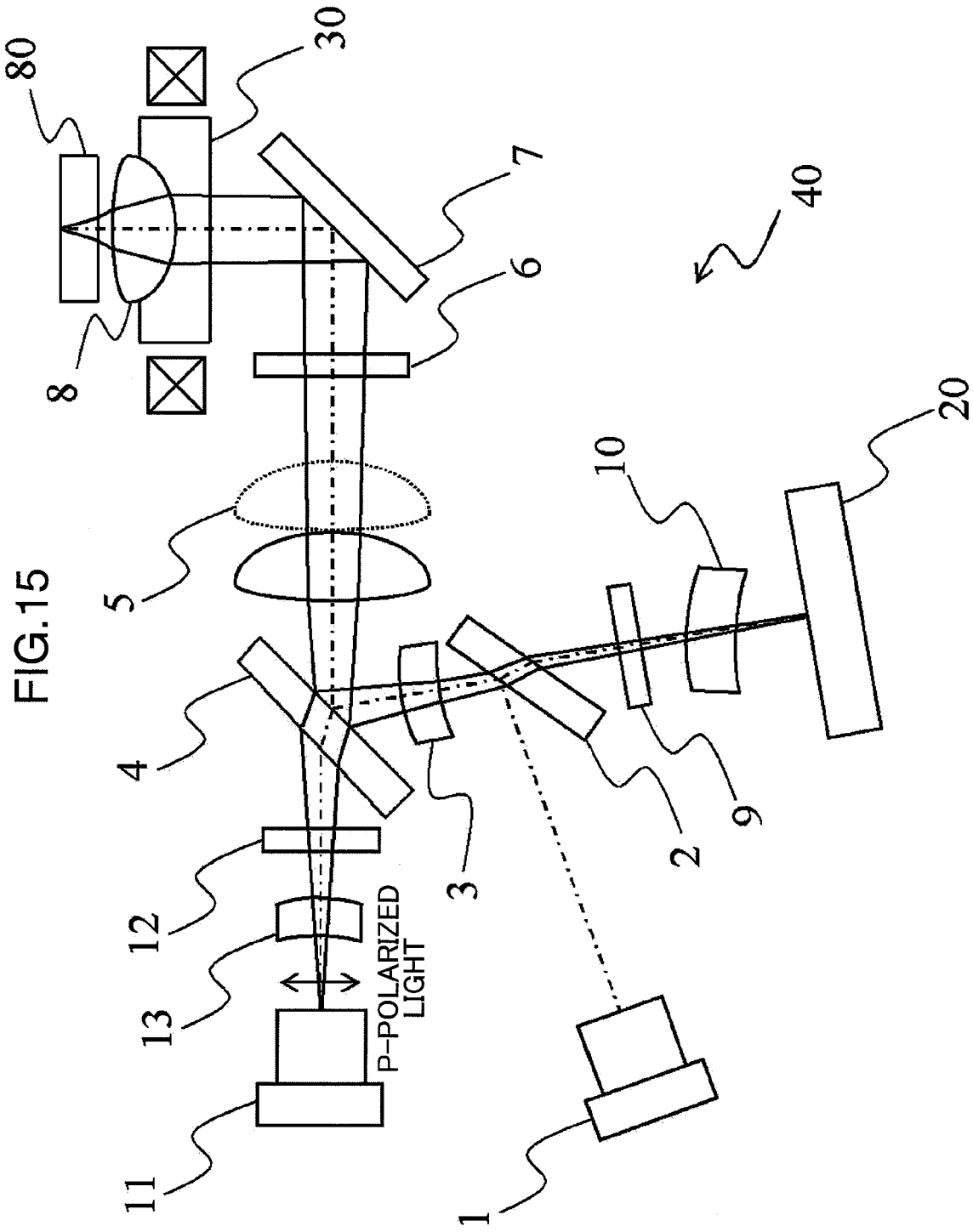
FIG. 15 is a diagram showing a schematic construction of an optical head including a relay lens arranged between the two-wavelength light source and the wedge prism in the first embodiment of the invention.

FIG. 15 is a diagram showing a schematic construction of the optical head including a relay lens arranged between the two-wavelength light source and the wedge prism in the first embodiment of the present invention. Generally, third-order coma aberration produced by off-axis incidence is substantially proportional to an angle of ray incident on the objective lens 8 (angle of view). Accordingly, if a distance 6 between the emitting points of the red and infrared laser beams and the focal length of the objective lens 8 are constant, the third-order coma aberration is inversely proportional to the focal length of the collimator lens 5 (combined focal length). Accordingly, by inserting a relay lens 13 having the power of a concave lens between the collimator lens 5 and the two-wavelength light source 11 to increase the combined focal length as shown in FIG. 15, the third-order coma aberration caused by the off-axis incidence can be suppressed. It should be noted that the relay lens 13 corresponds to an example of a second coupling lens.

On the other hand, in the case of using an objective lens with relatively small coma aberration caused by the off-axis incidence, a relay lens having the power of a convex lens may also be used. In this case, it is possible to reduce the combined focal length and improve light utilization efficiency.

The number of parts can be reduced by forming the relay lens 13 integral to the diffraction grating 12. At this time, a lens forming mold can be easily fabricated by forming either the incident surface or the emergent surface of the relay lens 13 into a flat surface and forming the diffraction grating on this flat surface. If the distance between the relay lens 13 and the two-wavelength light source 11 changes, magnification changes and distances between a main beam and sub beams produced also change if the relay lens 13 and the diffraction grating are united. Thus, the relay lens and the two-wavelength light source 11 are preferably held in an integral holder so as not to change the distance therebetween.

Although red and infrared laser beams are emitted from the two-wavelength light source 11 in this embodiment, a red laser light source and an infrared laser light source may be separately provided. By separately providing the red laser light source and the infrared laser light source, the optical axes of the red and infrared laser beams can conform to each other, wherefore coma aberration caused by off-axis incidence can be suppressed.

As described above, the optical head 40 of this embodiment can record or reproduce information by focusing laser beams having different wavelengths on different types of optical discs, e.g. on the BD 60, the DVD 70 and the CD 80 using one objective lens 8.

Second Embodiment

Figure 16:
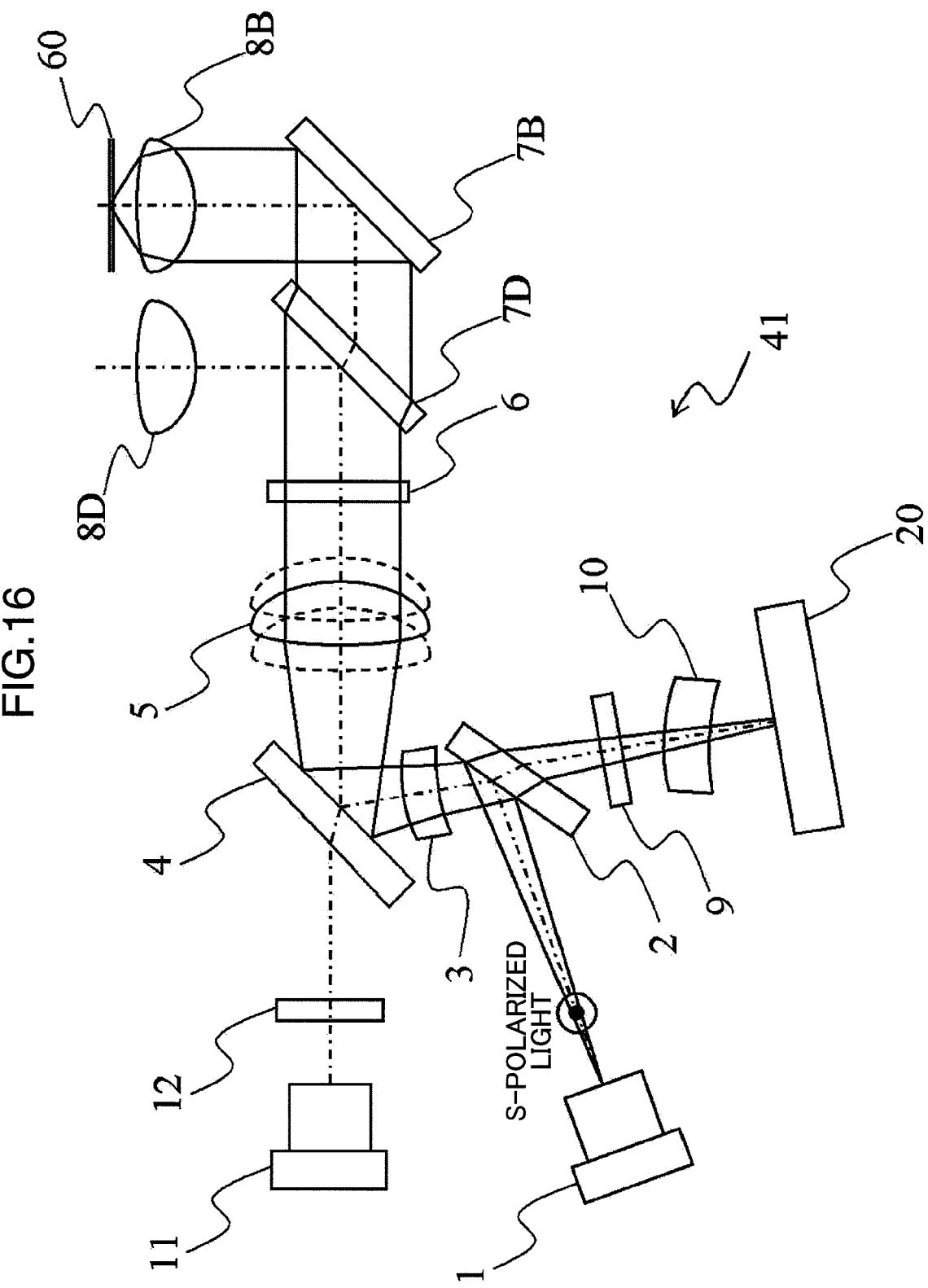
FIG. 16 is a diagram showing a schematic construction of an optical head in the case of recording or reproducing information on or from a BD in a second embodiment of the invention.
Figure 17:
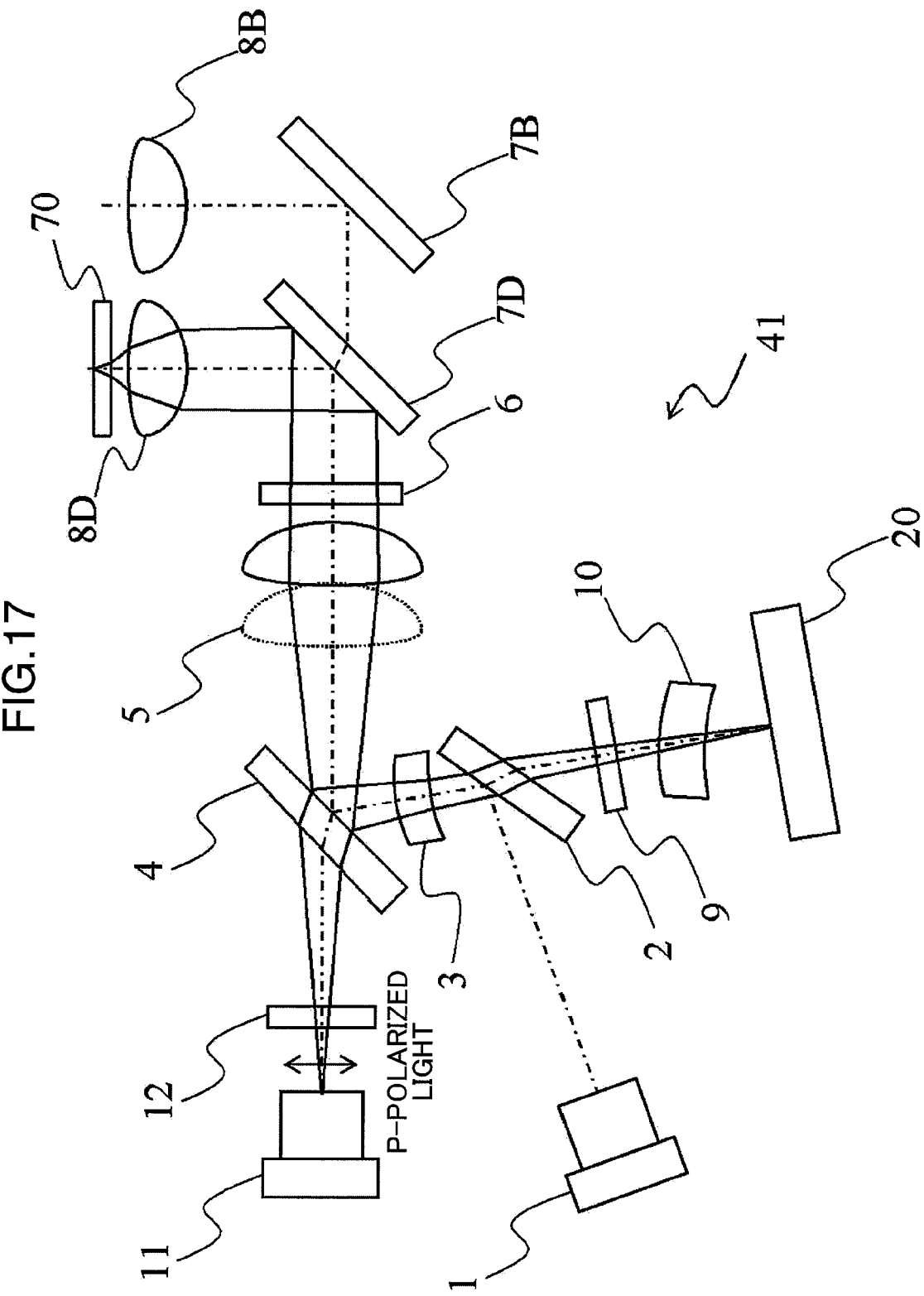
FIG. 17 is a diagram showing a schematic construction of the optical head in the case of recording or reproducing information on or from a DVD in the second embodiment of the invention.

FIGS. 16 and 17 are diagrams showing schematic constructions of an optical head according to a second embodiment of the present invention. FIG. 16 is a diagram showing the schematic construction of the optical head in the case of recording or reproducing information on or from a BD in the second embodiment of the present invention, and FIG. 17 is a diagram showing the schematic construction of the optical head in the case of recording or reproducing information on or from a DVD or a CD in the second embodiment of the present invention. In the second embodiment, constituent elements common to the first embodiment are identified by the same reference numerals and not described below.

In FIG. 16, an optical head 41 is provided with a light source 1, a flat beam splitter 2, a relay lens 3, a wedge prism 4, a collimator lens 5, a quarter wave plate 6, a first mirror 7D, a second mirror 7B, a first objective lens 8D, a second objective lens 8B, a detection hologram 9, a detection lens 10, a two-wavelength light source 11, a diffraction grating 12 and a light receiving element 20.

The first mirror 7D transmits a blue-violet laser beam and reflects red and infrared laser beams toward the first objective lens 8D. The second mirror 7B reflects the blue-violet laser beam having passed through the first mirror 7D toward the second objective lens 8B. The first objective lens 8D focuses the red laser beam on an information recording surface of a DVD 70 and focuses the infrared laser beam on an information recording surface of a CD 80. The second objective lens 8B focuses the blue-violet laser beam on an information recording surface of a BD 60.

First of all, an operation of the optical head 41 to record or reproduce information on or from the BD 60 is described with reference to FIG. 16.

In FIG. 16, a blue-violet laser beam having a wavelength of 405 nm and emitted from the light source 1 is incident in the form of an S-polarized beam on the flat beam splitter 2. The blue-violet laser beam reflected by the flat beam splitter 2 passes through the relay lens 3 to be converted into a divergent beam having a different NA. The blue-violet laser beam is converted into a substantially parallel beam by the collimator lens 5 and converted from the linearly polarized beam into a circularly polarized beam by the quarter wave plate 6 after being reflected by the wedge prism 4. Subsequently, the blue-violet laser beam is focused as a light spot on the information recording surface of the BD 60 through a protective substrate by the second objective lens 8B after passing through the first mirror 7D and being reflected by the second mirror 7B.

The blue-violet laser beam reflected by the information recording surface of the BD 60 passes through the second objective lens 8B again, is reflected by the second mirror 7B, passes through the first mirror 7D and is converted into a linearly polarized beam different from the one on an outward path by the quarter wave plate 6. Thereafter, the blue-violet laser beam is converted into a convergent beam by the collimator lens 5, reflected by the wedge prism 4 and converted into a convergent beam having a different NA by the relay lens 3. Further, the blue-violet laser beam is incident in the form of a P-polarized beam on the flat beam splitter 2 to pass through it. Then, when the blue-violet laser beam passes through the detection hologram 9, $0^{th}$-order light and $\pm 1^{st}$-order diffracted light are generated therefrom, have astigmatism given thereto by the detection lens 10 and are introduced to the light receiving element 20.

Next, an operation of the optical head 41 to record or reproduce information on or from the DVD 70 as an optical disc whose protective substrate is 0.6 mm in thickness is described with reference to FIG. 17.

In FIG. 17, a red laser beam having a wavelength of 660 nm and emitted from the two-wavelength light source 11 is incident in the form of a P-polarized beam on the wedge prism 4 after being separated into a main beam as $0^{th}$-order light and sub beams as $\pm 1^{st}$-order diffracted light by the diffraction grating 12. The red laser beam having passed through the wedge prism 4 is converted into a slightly convergent beam by the collimator lens 5 and converted from the linearly polarized beam into a circularly polarized beam by the quarter wave plate 6. The red laser beam is focused as a light spot on the information recording surface of the DVD 70 through the protective substrate by the first objective lens 8D after being reflected by the first mirror 7D.

The red laser beam reflected by the information recording surface of the DVD 70 passes through the first objective lens 8D again and is converted into a convergent beam by the collimator lens 5 after being reflected by the first mirror 7D and converted into a linearly polarized beam different from the one on an outward path by the quarter wave plate 6. The red laser beam is incident in the form of an S-polarized beam on the wedge prism 4 to be reflected, and converted into a convergent beam having a different NA by the relay lens 3. Thereafter, the red laser beam passes through the flat beam splitter 2 and the detection hologram 9 and is introduced to the light receiving element 20 after astigmatism is given thereto by the detection lens 10.

Further, an infrared laser beam having a wavelength of 785 nm in the form of the P-polarized light and emitted from the two-wavelength light source 11 is focused as a light spot on the information recording surface of the CD 80 through a protective substrate by the first objective lens 8D similar to the red laser beam. The infrared laser beam reflected by the information recording surface of the CD 80 is introduced to the light receiving element 20 similar to the red laser beam.

The first objective lens 8D can focus the red laser beam for recording or reproducing information on or from the DVD 70 and the infrared laser beam for recording or reproducing info on or from the CD 80 as microscopic light spots respectively, utilizing a wavelength difference. The second objective lens 8B can focus the blue-violet laser beam for recording or reproducing information on or from the BD 60 as a microscopic light spot. The first and second objective lenses 8D, 8B are mounted on the same objective lens actuator (not shown) and are driven such that the light spot follows an information track of the rotating optical disc using a focus error signal and a tracking error signal.

The optical head 41 of this embodiment can also record or reproduce information on or from different types of optical discs, e.g. the BD 60, the DVD 70 and the CD 80 by focusing laser beams having different wavelengths similar to the optical head 40 described in the first embodiment.

Third Embodiment

Figure 18:
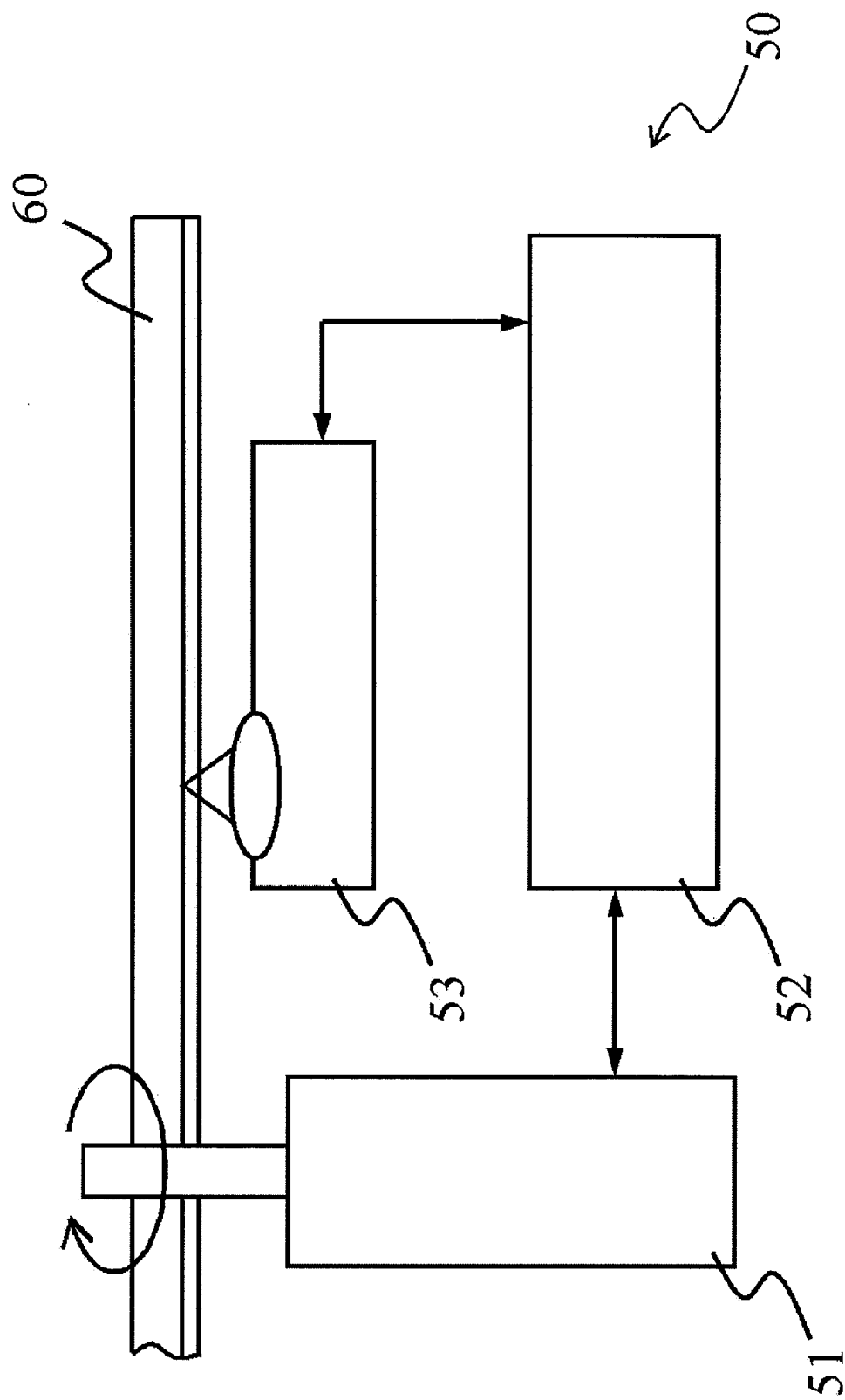
FIG. 18 is a diagram showing a schematic construction of an optical disc device in a third embodiment of the invention.

FIG. 18 is a diagram showing a schematic construction of an optical disc device according to a third embodiment of the present invention.

In FIG. 18, an optical disc device 50 is internally provided with an optical disc driver 51, a controller 52 and an optical head 53. Although a BD 60 is loaded as an optical disc in the optical disc device 50 in FIG. 18, it can be replaced by a DVD 70 or a CD 80.

The optical disc driver 51 rotates the BD 60 (or DVD 70 or CD 80). The optical head 53 is either one of the optical heads described in the first and second embodiments. The controller 52 controls the driving of the optical disc driver 51 and the optical head 53 and processes control signals and information signals photoelectrically converted in the optical head 53. The controller 52 also has a function of interfacing information signals between the outside and the inside of the optical disc device 50.

The controller 52 receives a control signal from the optical head 53 and executes a focus control, a tracking control and an information reproduction control and controls the rotation of the optical disc driver 51 in accordance with the control signal. Further, the controller 52 reproduces information from an information signal and sends out a recording signal to the optical head 53.

Since the optical disc device 50 is mounted with either one of the optical heads described in the first and second embodiments, the optical disc device 50 of the third embodiment can satisfactorily record or reproduce information on or from a plurality of types of optical discs corresponding to a plurality of light sources.

Fourth Embodiment

Figure 19:
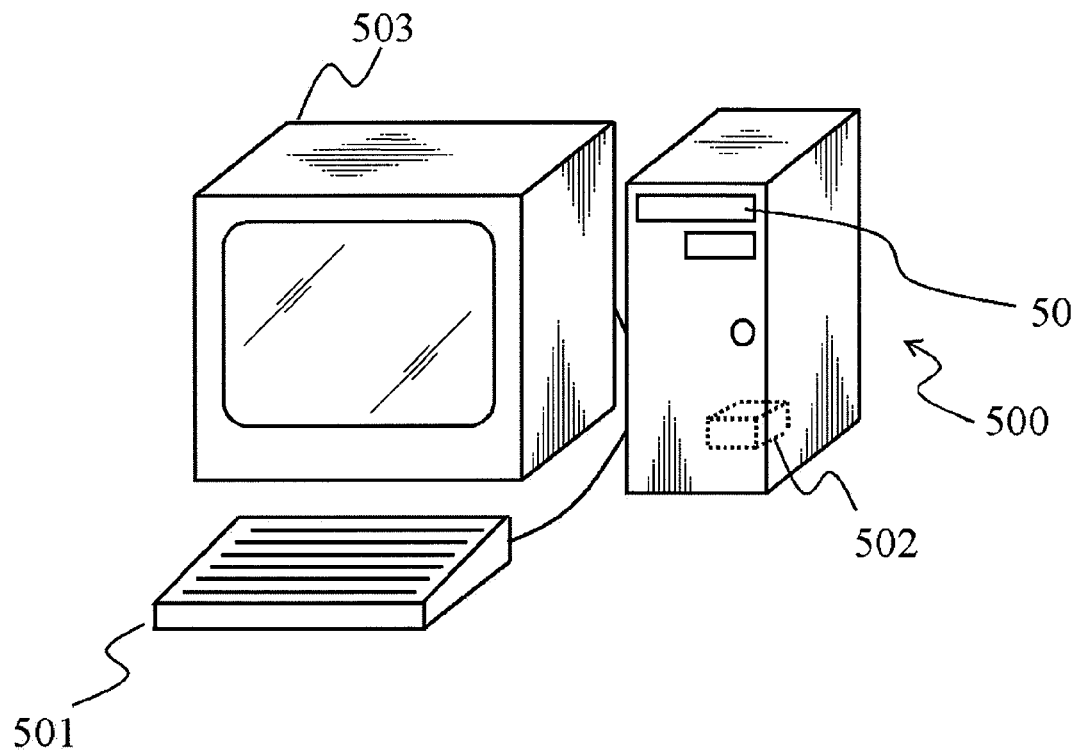
FIG. 19 is a diagram showing a schematic construction of a computer in a fourth embodiment of the invention.

FIG. 19 is a diagram showing a schematic construction of a computer according to a fourth embodiment of the present invention.

In FIG. 19, a computer 500 is provided with the optical disc device 50 of the third embodiment, an input device 501 such as a keyboard, a mouse or a touch panel used to enter information, an arithmetic unit 502 such as a central processing unit (CPU) for performing computation based on information entered via the input device 501, information read from the optical disc device 50 and the like, and an output device 503 such as a cathode ray tube or a liquid crystal display device for displaying information such as computational result by the arithmetic unit 502 or a printer for printing information.

In this embodiment, the computer 500 corresponds to an example of an information recording and/or reproducing device and the arithmetic unit 502 corresponds to an example of an information processing section.

Since the computer 500 includes the optical disc device 50 of the third embodiment, it can satisfactorily record or reproduce information on or from a plurality of types of optical discs and can have a wide range of applications.

Fifth Embodiment

Figure 20:
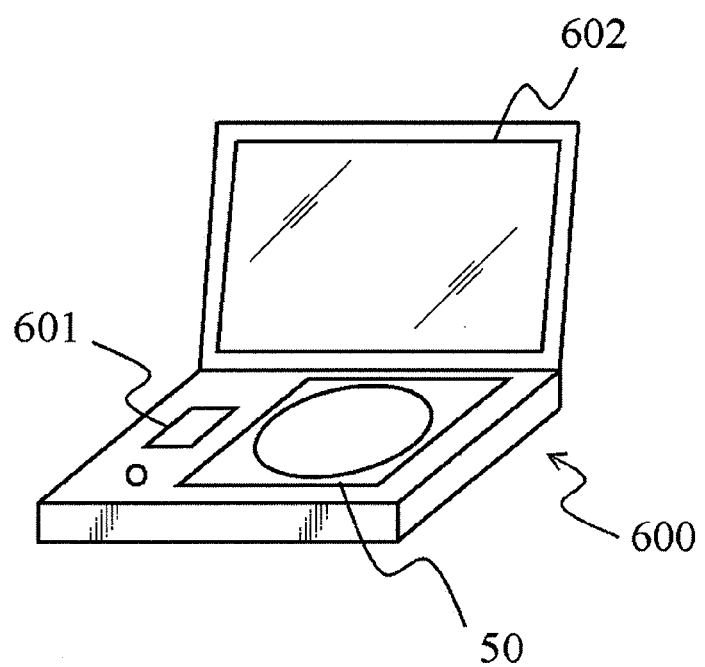
FIG. 20 is a diagram showing a schematic construction of an optical disc player in a fifth embodiment of the invention.

FIG. 20 is a diagram showing a schematic construction of an optical disc player according to a fifth embodiment of the present invention.

In FIG. 20, an optical disc player 600 is provided with the optical disc device 50 of the third embodiment and a decoder 601 for converting an information signal obtained from the optical disc device 50 into an image signal.

The optical disc player 600 can be used as a car navigation system by adding a position sensor such as a GPS and a central processing unit (CPU). It is also possible to add a display device 602 such as a liquid crystal monitor.

In this embodiment, the optical disc player 600 corresponds to an example of the information recording and/or reproducing device and the decoder 601 corresponds to an example of the information processing section.

Since the optical disc player 600 includes the optical disc device 50 of the third embodiment, it can satisfactorily record or reproduce information on or from a plurality of types of optical discs and can have a wide range of applications.

Sixth Embodiment

Figure 21:
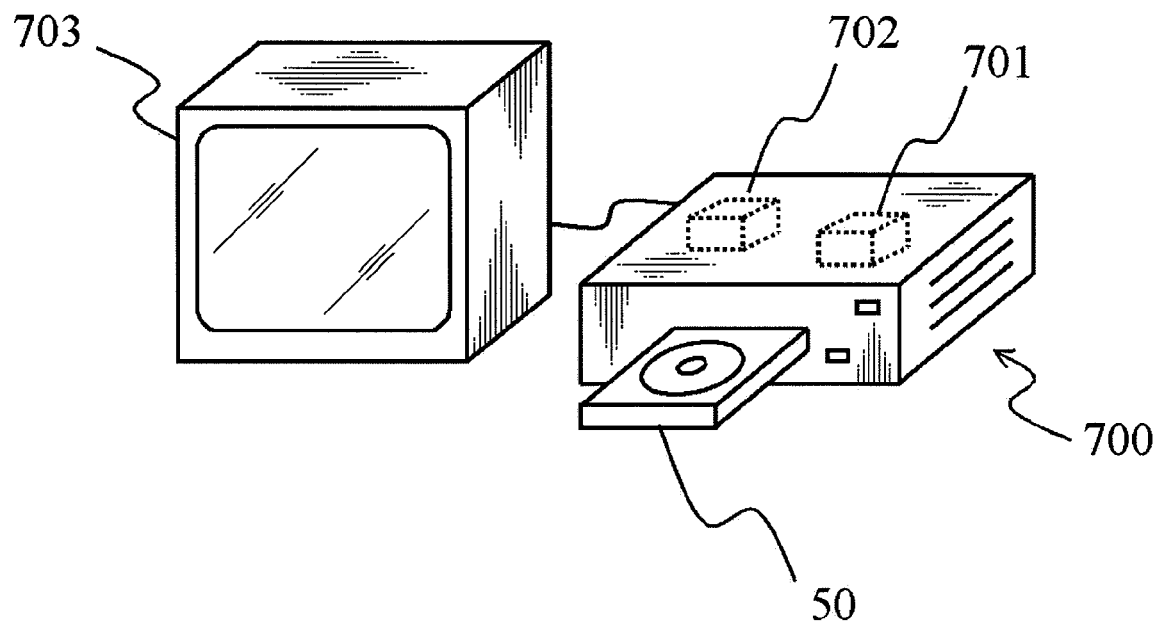
FIG. 21 is a diagram showing a schematic construction of an optical disc recorder in a sixth embodiment of the invention.
Figure 22:
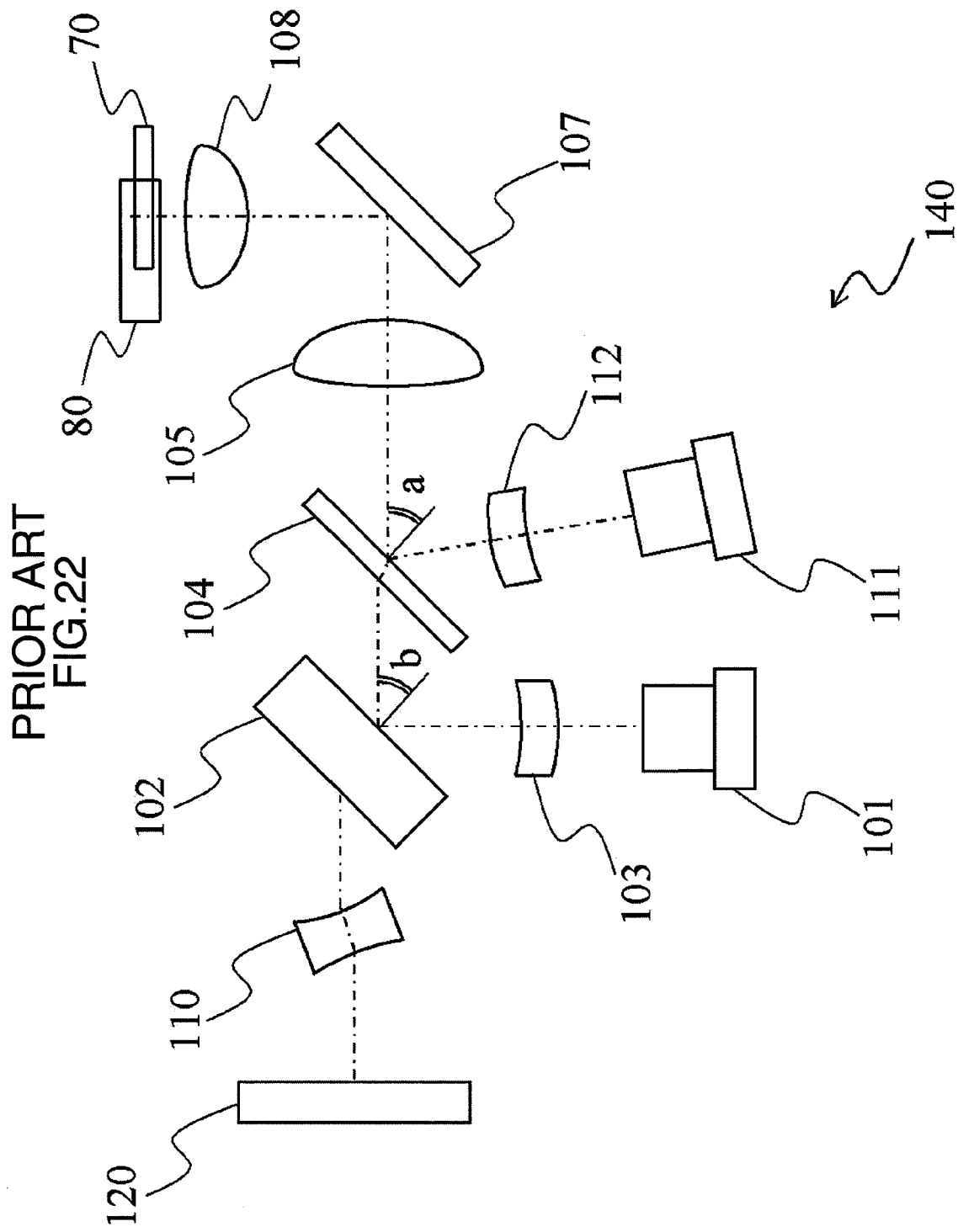
FIG. 22 is a diagram showing the construction of a conventional optical head.

FIG. 21 is a diagram showing a schematic construction of an optical disc recorder according to a sixth embodiment of the present invention.

In FIG. 21, an optical disc recorder 700 is provided with the optical disc device 50 of the third embodiment and an encoder 701 for converting image information into an information signal to be recorded on an optical disc by the optical disc device 50. Preferably, a decoder 702 for converting an information signal obtained from the optical disc device 50 into image information is also provided, thereby enabling reproduction of a recorded image. The optical disc recorder 700 may include an output device 703 such as a cathode ray tube or a liquid crystal display device for displaying information or a printer for printing information.

In this embodiment, the optical disc recorder 700 corresponds to an example of the information recording and/or reproducing device and the encoder 701 and the decoder 702 correspond to an example of the information processing section.

Since the optical disc recorder 700 includes the optical disc device 50 of the third embodiment, it can satisfactorily record or reproduce information on or from a plurality of types of optical discs and can have a wide range of applications.

The above specific embodiments mainly embrace inventions having the following constructions.

An optical head according to one aspect of the present invention comprises a first light source for emitting a first laser beam having a first wavelength shorter than 430 nm; a second light source for emitting a second laser beam having a second wavelength equal to or longer than 430 nm; a first light reflecting member in the form of a single plate for reflecting the first laser beam emitted from the first light source; a second light reflecting member in the form of a single plate for reflecting the first laser beam reflected by the first light reflecting member and transmitting the second laser beam emitted from the second light source; and an objective lens for focusing the first laser beam reflected by the second light reflecting member on an information recording surface of a first information recording medium, wherein the first light source is arranged such that the optical axis of the first laser beam emitted from the first light source is inclined with respect to that of the second laser beam emitted from the second light source.

According to this construction, the first laser beam having the first wavelength shorter than 430 nm is emitted from the first light source and the second laser beam having the second wavelength equal to or longer than 430 nm is emitted from the second light source. The first laser beam emitted from the first light source is reflected by the first light reflecting member in the form of the single plate, and the first laser beam reflected by the first light reflecting member is reflected by the second light reflecting member in the form of the single plate and the second laser beam emitted from the second light source passes through the second light reflecting member. Then, the first laser beam reflected by the second light reflecting member is focused on the information recording surface of the first information recording medium by the objective lens. The first light source is arranged such that the optical axis of the first laser beam emitted from the first light source is inclined with respect to that of the second laser beam emitted from the second light source.

Since the first light source is arranged such that the optical axis of the first laser beam emitted from the first light source is inclined with respect to that of the second laser beam emitted from the second light source, a distance between the first and second light reflecting members can be shortened and the miniaturization of the optical head can be realized.

In the above optical head, an incident angle $\theta 1$ of a chief ray of the first laser beam incident on the first light reflecting member satisfies $\pi/4 < \theta 1 < \text{Arctan}(n2/n1)\text{[rad]}$ and an incident angle $\theta 2$ of the chief ray of the first laser beam incident on the second light reflecting member satisfies $\pi/4 > \theta 2\text{[rad]}$ when n1 and n2 denote a refractive index of air and a refractive index of a material of the first light reflecting member at the first wavelength.

According to this construction, the incident angle $\theta 1$ of the chief ray of the first laser beam incident on the first light reflecting member satisfies $\pi/4 < \theta 1 < \text{Arctan}(n2/n1)\text{[rad]}$ and the incident angle $\theta 2$ of the chief ray of the first laser beam incident on the second light reflecting member satisfies $\pi/4 > \theta 2\text{[rad]}$ when n1 and n2 denote the refractive index of air and the refractive index of the material of the first light reflecting member at the first wavelength. Therefore, the distance between the first and second light reflecting members can be made shorter than a distance between the first and second light sources and the miniaturization of the optical head can be realized.

In the above optical head, the first light source is preferably arranged at a position inclined in such a direction as to equalize a light quantity distribution of a far field pattern with respect to the optical axis of the first laser beam reflected by the first light reflecting member in a plane including the optical axis of the first laser beam emitted from the first light source and that of the second laser beam emitted from the second light source.

According to this construction, the first light source is arranged at the position inclined in such a direction as to equalize the light quantity distribution of the far field pattern with respect to the optical axis of the first laser beam reflected by the first light reflecting member in the plane including the optical axis of the first laser beam emitted from the first light source and that of the second laser beam emitted from the second light source. Therefore, the light quantity distribution of the far field pattern can be equalized and information recording accuracy and information reproducing accuracy can be improved.

In the above optical head, it is preferable that the second light reflecting member has a first surface, on which the second laser beam is incident, and a second surface, which faces the first surface and from which the second laser beam is emitted; and that the first and second surfaces are not parallel.

According to this construction, the first surface, on which the second laser beam is incident, and the second surface, from which the second laser beam is emitted, are not parallel in the second light reflecting member, and both third-order astigmatism and third-order coma aberration produced when the second laser beam having passed through the second light reflecting member is focused by the objective lens can be reduced by inclining the first and second surfaces at specified angles.

In the above optical head, it is preferable to further comprise a first coupling lens arranged between the first and second light reflecting members.

According to this construction, by arranging the first coupling lens between the first and second light reflecting members, the NA of the first laser beam incident on the first light reflecting member becomes relatively smaller and the asymmetry of the light quantity distribution can be suppressed as compared with the case where the first coupling lens is arranged between the first light source and the first light reflecting member.

In the above optical head, the first coupling lens preferably has the power of a concave lens.

According to this construction, since the first coupling lens has the power of the concave lens, it is not necessary to give a large concave lens power to a detection lens for detecting a laser beam reflected by the optical disc, wherefore a radius of curvature of the detection lens can be increased and the detection lens can be inexpensively formed.

In the above optical head, the first coupling lens is preferably made of a resin material. According to this construction, the first coupling lens can be more inexpensively formed as compared with the case where it is made of a glass material since being made of the resin material.

In the above optical head, it is preferable to further comprise a second coupling lens arranged between the second light source and the second light reflecting member.

According to this construction, third-order coma aberration produced by the off-axis incidence of the second laser beam can be suppressed since the second coupling lens is arranged between the second light source and the second light reflecting member.

In the above optical head, the second coupling lens preferably has the power of a concave lens.

According to this construction, since the second coupling lens has the power of the concave lens, a combined focal length of a collimator lens provided between the second light reflecting member and the objective lens can be increased and third-order coma aberration produced by the off-axis incidence of the second laser beam can be suppressed.

In the above optical head, it is preferable that either one of an incident surface and an emergent surface of the second coupling lens is a flat surface; and that a diffraction grating is formed on the flat surface.

According to this construction, since either one of the incident surface and the emergent surface of the second coupling lens is the flat surface and the diffraction grating is formed on the flat surface, the diffraction grating for separating the second laser beam into a main beam and sub beams can be united with the second coupling lens, thereby reducing the number of parts.

In the above optical head, it is preferable that the first light source is arranged such that the first laser beam is incident substantially in the form of S-polarized light on the first light reflecting member; and that the second light source is arranged such that the second laser beam is incident substantially in the form of P-polarized light on the second light reflecting member.

According to this construction, the first laser beam substantially in the form of the S-polarized light is incident on the first light reflecting member from the first light source, and the second laser beam substantially in the form of the P-polarized light is incident on the second light reflecting member from the second light source. Thus, light utilization efficiency on an outward path can be improved by designing the first light reflecting member to reflect the first laser beam substantially in the form of the S-polarized light and designing the second light reflecting member to transmit the second laser beam substantially in the form of the P-polarized light.

Further, since the first light source is arranged such that the first laser beam is incident substantially in the form of the S-polarized light on the first light reflecting member, a far field pattern with a high rim intensity in a radial direction of the information recording medium can be obtained and a half wave plate for rotating a polarization direction of the first laser beam becomes unnecessary, whereby the number of parts of the optical head can be reduced.

In the above optical head, it is preferable that a third light source for emitting a third laser beam having a third wavelength longer than the second wavelength is further provided; and that the second and third light sources are in the form of a united two-wavelength light source.

In the above optical head, the third light source is preferably arranged at a specified distance to the second light source in the plane including the optical axis of the first laser beam emitted from the first light source and that of the second laser beam emitted from the second light source.

In the above optical head, the objective lens preferably focuses the second laser beam having passed through the second light reflecting member on an information recording surface of a second information recording medium different from the first information recording medium.

In the above optical head, it is preferable that a third light source for emitting a third laser beam having a third wavelength longer than the second wavelength is further provided; that the second light reflecting member transmits the third laser beam emitted from the third light source; and that the objective lens focuses the third laser beam having passed through the second light reflecting member on an information recording surface of a third information recording medium different from the first and second information recording media.

In the above optical head, the objective lens preferably includes a first objective lens for focusing the first laser beam reflected by the second light reflecting member on the information recording surface of the first information recording medium and a second objective lens for focusing the second laser beam having passed through the second light reflecting member on an information recording surface of a second information recording medium different from the first information recording medium.

In the above optical head, it is preferable that a third light source for emitting a third laser beam having a third wavelength longer than the second wavelength is further provided; the second light reflecting member transmits the third laser beam emitted from the third light source; and that the second objective lens focuses the third laser beam having passed through the second light reflecting member on an information recording surface of a third information recording medium different from the first and second information recording media.

An optical disc device according to another aspect of the present invention comprises any one of the above optical heads; a motor for rotating an information recording medium and a controller for controlling the optical head and the motor. According to this construction, the above optical head can be applied to an optical disc device.

An information recording and/or reproducing device according to still another aspect of the present invention comprises the above optical disc device; and an information processing section for processing information to be recorded by the optical disc device and/or information reproduced from the optical disc device. According to this construction, the optical disc including the above optical head can be applied to an information recording and/or reproducing device.

The optical head according to the present invention can satisfactorily record or reproduce information on or from a plurality of types of optical discs, comprises a plurality of light sources having different wavelengths and is useful as an optical head for optically recording or reproducing information on or from a plurality of types of optical discs.

The productivity of the optical disc device according to the present invention can be improved and the production cost thereof can be reduced since the construction of the optical head is simplified, wherefore this optical disc device is useful as an optical disc device equipped with an optical head.

Further, the information recording and/or reproducing device according to the present invention can satisfactorily record or reproduce information on or from a plurality of types of optical discs, can have a wide range of applications and is useful as an information recording and/or reproducing device equipped with an optical disc device.

This application is based on Japanese Patent Application No. 2008-094694 filed on Apr. 1, 2008, the contents of which are hereby incorporated by reference.

The specific embodiments or examples given in the detailed description of the invention are definitely for elucidating the technical contents of the present invention, and the present invention should not be narrowly interpreted while being limited only to such specific examples. Various changes can be made without departing from the spirit of the present invention and the scope as claimed below.

What is claimed is:

1. An optical head, comprising:
   a first light source for emitting a first laser beam having a first wavelength shorter than 430 nm;
   a second light source for emitting a second laser beam having a second wavelength equal to or longer than 430 nm;
   a first light reflecting member in the form of a single plate for reflecting the first laser beam emitted from the first light source;
   a second light reflecting member in the form of a single plate for reflecting the first laser beam reflected by the first light reflecting member and transmitting the second laser beam emitted from the second light source; and
   an objective lens for focusing the first laser beam reflected by the second light reflecting member on an information recording surface of a first information recording medium,
   wherein an incident angle $\theta1$ of a chief ray of the first laser beam incident on the first light reflecting member satisfies $\pi/4 < \theta1 < \text{Arctan}(n2/n1)$ [rad] and an incident angle $\theta2$ of the chief ray of the first laser beam incident on the second light reflecting member satisfies $\pi/4 > \theta2$ [rad] when n1 and n2 denote a refractive index of air and a refractive index of a material of the first light reflecting member at the first wavelength.

2. An optical head according to claim 1, wherein the first light source is arranged at a position inclined in such a direction as to equalize a light quantity distribution of a far field pattern with respect to the optical axis of the first laser beam reflected by the first light reflecting member in a plane including the optical axis of the first laser beam emitted from the first light source and that of the second laser beam emitted from the second light source.

3. An optical head according to claim 1, wherein:
   the second light reflecting member has a first surface, on which the second laser beam is incident, and a second surface, which faces the first surface and from which the second laser beam is emitted; and
   the first and second surfaces are not parallel.

4. An optical head according to claim 1, further comprising a first coupling lens arranged between the first and second light reflecting members.

5. An optical head according to claim 4, wherein the first coupling lens has the power of a concave lens.

6. An optical head according to claim 4, wherein the first coupling lens is made of a resin material.

7. An optical head according to claim 1, further comprising a second coupling lens arranged between the second light source and the second light reflecting member.

8. An optical head according to claim 7, wherein the second coupling lens has the power of a concave lens.

9. An optical head according to claim 7, wherein:
   either one of an incident surface and an emergent surface of the second coupling lens is a flat surface; and
   a diffraction grating is formed on the flat surface.

10. An optical head according to claim 1, wherein:
    the first light source is arranged such that the first laser beam is incident substantially in the form of S-polarized light on the first light reflecting member; and
    the second light source is arranged such that the second laser beam is incident substantially in the form of P-polarized light on the second light reflecting member.

11. An optical disc device, comprising:
    the optical head according to claim 1;
    a motor for rotating an information recording medium; and
    a controller for controlling the optical head and the motor.

12. An information recording and/or reproducing device, comprising:
    the optical disc device according to claim 11; and
    an information processing section for processing information to be recorded by the optical disc device and/or information reproduced from the optical disc device.

* * * * *